United States Patent
Nitsopoulos

(10) Patent No.: US 12,287,807 B1
(45) Date of Patent: *Apr. 29, 2025

(54) SYSTEMS AND METHODS FOR COLLECTING AND DISTRIBUTING DIGITAL EXPERIENCE INFORMATION

(71) Applicant: The PNC Financial Services Group, Inc., Pittsburgh, PA (US)

(72) Inventor: Michael Nitsopoulos, Pittsburgh, PA (US)

(73) Assignee: The PNC Financial Services Group, Inc., Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/588,329

(22) Filed: Feb. 27, 2024

Related U.S. Application Data

(63) Continuation of application No. 17/010,008, filed on Sep. 2, 2020, now Pat. No. 11,947,563.

(60) Provisional application No. 62/983,581, filed on Feb. 29, 2020.

(51) Int. Cl.
G06F 16/27 (2019.01)
G06F 16/28 (2019.01)

(52) U.S. Cl.
CPC ............ *G06F 16/27* (2019.01); *G06F 16/273* (2019.01); *G06F 16/275* (2019.01); *G06F 16/278* (2019.01); *G06F 16/284* (2019.01)

(58) Field of Classification Search
CPC ...... G06F 16/27; G06F 16/273; G06F 16/284; G06F 16/275; G06F 16/278
See application file for complete search history.

(56) References Cited

U.S. PATENT DOCUMENTS

| | | |
|---|---|---|
| 6,496,850 B1 | 12/2002 | Bowman-Amuah |
| 8,200,247 B1 | 6/2012 | Starenky et al. |
| 10,635,433 B2 | 4/2020 | Khoongumjorn et al. |
| 2007/0088836 A1 | 4/2007 | Tai et al. |
| 2008/0189432 A1 | 8/2008 | Abali et al. |
| 2010/0103837 A1 | 4/2010 | Jungck et al. |
| 2012/0054178 A1 | 3/2012 | Tran et al. |
| 2012/0278736 A1 | 11/2012 | Tran et al. |
| 2013/0246511 A1 | 9/2013 | Brown et al. |

(Continued)

*Primary Examiner* — Kris E Mackes
*Assistant Examiner* — Lin Lin M Htay
(74) *Attorney, Agent, or Firm* — Finnegan, Henderson, Farabow, Garrett & Dunner, LLP

(57) ABSTRACT

In one implementation, systems and methods are provided for collecting and sharing digital experience information. A computer-implemented system for collecting and distributing digital experience information may comprise a digital experience application that may be configured to host a plurality of micro-applications, a first micro-application being able to be configured to detect application events and application states; a connector that may be configured to receive information corresponding to the detected application events and application states and belonging to a category; an event backbone that may be configured to route the information received by the connector based on the category; a database that may be configured to store the received information; wherein the event backbone may be further configured to send information to the connector from the event backbone and the database based on one or more criteria; and wherein a second micro-application may be configured to receive information belonging to the category from the connector.

20 Claims, 26 Drawing Sheets

(56) References Cited

U.S. PATENT DOCUMENTS

| | | |
|---|---|---|
| 2013/0325960 A1 | 12/2013 | Agarwal et al. |
| 2014/0089815 A1 | 3/2014 | Gildfind et al. |
| 2015/0324339 A1 | 11/2015 | Gubin et al. |
| 2016/0117204 A1 | 4/2016 | Blazek et al. |
| 2016/0140338 A1 | 5/2016 | Walters et al. |
| 2016/0381118 A1 | 12/2016 | Andrews et al. |
| 2018/0032627 A1 | 2/2018 | Margatan |
| 2018/0197143 A1 | 7/2018 | Daub et al. |
| 2019/0065177 A1 | 2/2019 | Khoongumjorn et al. |
| 2019/0165950 A1 | 5/2019 | Ibrahim |
| 2020/0089747 A1 | 3/2020 | Hofer et al. |
| 2020/0133982 A1 | 4/2020 | Thangeswaran et al. |

SYSTEMS AND METHODS FOR COLLECTING AND DISTRIBUTING DIGITAL EXPERIENCE INFORMATION

CROSS REFERENCE TO RELATED APPLICATIONS

The present application is a continuation application of U.S. application Ser. No. 17/010,008, filed Sep. 2, 2020, which claims priority to Provisional U.S. Patent Application Ser. No. 62/983,581, filed Feb. 29, 2020, the disclosures of each disclosure of which are incorporated herein by reference in their entirety.

The present application incorporates by reference Provisional U.S. Patent Application Ser. No. 62/983,529, filed Feb. 28, 2020, and Provisional U.S. Application Ser. No. 62/983,535, filed Feb. 28, 2020. The patent applications cited herein are incorporated by reference in their entireties, except for any definitions, subject matter disclaimers or disavowals, and except to the extent that the incorporated material is inconsistent with the express disclosure herein, in which case the language in this disclosure controls.

TECHNICAL FIELD

The present disclosure relates generally to computer-implemented systems and methods for collecting and distributing digital experience information. More specifically, and without limitation, this disclosure relates to computer-implemented systems and methods for collecting and distributing digital experience information using digital applications comprising one or more micro-applications and a central data location. The systems and methods disclosed herein may be used in various applications, such as business systems, systems that benefit from building functionality in small, discrete pieces, and systems comprising various sources of digital experience information and/or systems of record.

BACKGROUND

In digital application systems, it is often desirable to build functionality in small, discrete pieces commonly referred to as "micro-applications." Micro-applications allow digital application developers to work independently from one another on separate features and functions. They also allow developers to avoid rewriting code for the same tasks when developing new applications. Existing systems and methods for developing micro-applications, however, suffer from a number of drawbacks, including the inability to standardize the communication pattern between micro-applications, requiring specific code to be written for two or more micro-applications to share information. In addition, existing systems and methods are inefficient in that micro-applications are coupled through dependencies, resulting in micro-applications that are not self-reliant but rather rely on functions and outputs from other applications or micro-applications. Furthermore, existing systems and methods are cumbersome to use by developers, leading to degradation of code quality.

Moreover, in digital application systems, it is often desirable to collect information in a central accessible data location. A central data location simplifies storage and retrieval of information, allowing disparate systems to capture and share data. It also simplifies integration of new features, allowing data collected from an existing system to be used by a new system for example, reducing the time needed to release new features and applications. Existing systems and methods for processing digital experience information, however, suffer from a number of drawbacks, including the inability to provide real-time information. In addition, existing systems and methods are unable to perform deep data exploration, since handling large data with existing systems of record is cost prohibitive. Furthermore, existing systems and methods are cumbersome to use in that they require complex integration and intricate data schema designs to operate.

The inventors have identified a need to overcome these and other drawbacks of existing systems and for improved systems and methods for collecting and distributing digital experience information.

SUMMARY

In view of the foregoing, embodiments of the present disclosure provide computer-implemented systems and methods for processing digital experience information. The description below provides exemplary aspects of some computer-implemented systems and methods for processing digital experience information in accordance with some exemplary embodiments. Aspects may be combined with one or more suitable described aspects or other undescribed aspects. Aspects of one exemplary system or method may be combined with aspects of other exemplary systems, methods, or both.

An exemplary computer-implemented system for collecting and distributing digital experience information may comprise a digital experience application configured to host a plurality of micro-applications. The system may comprise a first micro-application being configured to detect application events and application states. The system may comprise a connector configured to receive first information corresponding to the detected application events and application states and belonging to a category. The system may comprise an event backbone configured to route the first information received by the connector based on the category. The system may comprise a database configured to store the first information. The event backbone may be further configured to select a second information from the database based on one or more criteria. The connector may be configured to route the selected second information to a second micro-application. The second micro-application may be configured to receive the first information belonging to the category from the connector.

The one or more criteria may include a criterion based on the category.

The first micro-application may send the first information to the event backbone and the database via a first set of application programming interfaces and the second micro-application may receive the second information from the event backbone and the database via a second set application programming interfaces. The first set of application programming interfaces may be configured to scale differently from the second set of application programming interfaces. The application programming interfaces may be built using a macron framework.

The system may comprise a third micro-application being configured to send third information to the connector. The first information may be compliant in a first data scheme. The third information may be compliant in a second data scheme. The first data scheme may be different from the second data scheme. The system may comprise a translator being configured to transform the first information and third information into a common data scheme.

The first micro-application may comprise a front-end and an outer application programming interface. The outer application programming interface may be built using the macron framework.

The system may comprise a system of record. The received first information may be transmitted to the system of record before being stored in the database. The system may comprise more than one system of record.

The second micro-application may be configured to receive the second information in real time.

The database may be a RDBMS database. The database may be a NoSQL database.

Another aspect of the present disclosure is directed to a method for collecting and distributing digital experience information, the method comprising the following operations performed by at least one processor: hosting a plurality of micro-applications at a digital experience application; detecting application events and applications at a first micro-application; receiving, at a connector, first information corresponding to the detected application events and application states and belonging to a category; routing the first information received by the connector based on the category; storing the first information at a database; selecting, at an event backbone, a second information from the database based on one or more criteria; sending the selected second information, via the connector, to a second micro-application; and receiving, at a second micro-application, the selected second information.

The one or more criteria include a criterion based on the category.

The first micro-application sends the first information to the event backbone and the database via a first set of application programming interfaces and the second micro-application receives the second information from the event backbone and the database via a second set application programming interfaces.

The first set of application programming interfaces is configured to scale differently from the second set of application programming interfaces.

It is to be understood that the foregoing general description and the following detailed description are exemplary and explanatory only, and are not restrictive of the disclosed embodiments.

BRIEF DESCRIPTION OF THE DRAWINGS

The accompanying drawings, which comprise a part of this specification, illustrate several embodiments and, together with the description, serve to explain the principles and features of the disclosed embodiments. In the drawings.

DETAILED DESCRIPTION

Reference will now be made in detail to exemplary embodiments, discussed with regards to the accompanying drawings. In some instances, the same reference numbers will be used throughout the drawings and the following description to refer to the same or like parts. Unless otherwise defined, technical and/or scientific terms have the meaning commonly understood by one of ordinary skill in the art. The disclosed embodiments are described in sufficient detail to enable those skilled in the art to practice the disclosed embodiments. It is to be understood that other embodiments may be utilized and that changes may be made without departing from the scope of the disclosed embodiments. For example, unless otherwise indicated, method steps disclosed in the figures can be rearranged, combined, or divided without departing from the envisioned embodiments. Similarly, additional steps may be added or steps may be removed without departing from the envisioned embodiments. Thus, the materials, methods, and examples are illustrative only and are not intended to be necessarily limiting.

Disclosed embodiments provide a standardized communication pattern between micro-applications that is not dependent on the environment. Disclosed embodiments use application states, rather than dependencies, to create micro-applications that are loosely coupled, resulting in micro-applications that can be more easily integrated into new systems. Disclosed embodiments provide a simple and elegant set of utilities that are integrated into the development process to help developers maintain high code quality and adhere to the same development techniques.

Moreover, disclosed embodiments provide a central data location capable of translating incoming information into a common data model, thereby facilitating the collection and sharing of information between disparate systems. Disclosed embodiments provide a central data location capable of acting on data and events in real-time, thereby providing other systems with information as events occur, rather than through inefficient read requests from a slow database or server. Disclosed embodiments provide a central data location capable of providing information in real-time, thereby avoiding using stale data in other systems and providing a more enjoyable user experience.

Architecture

Figure 1:
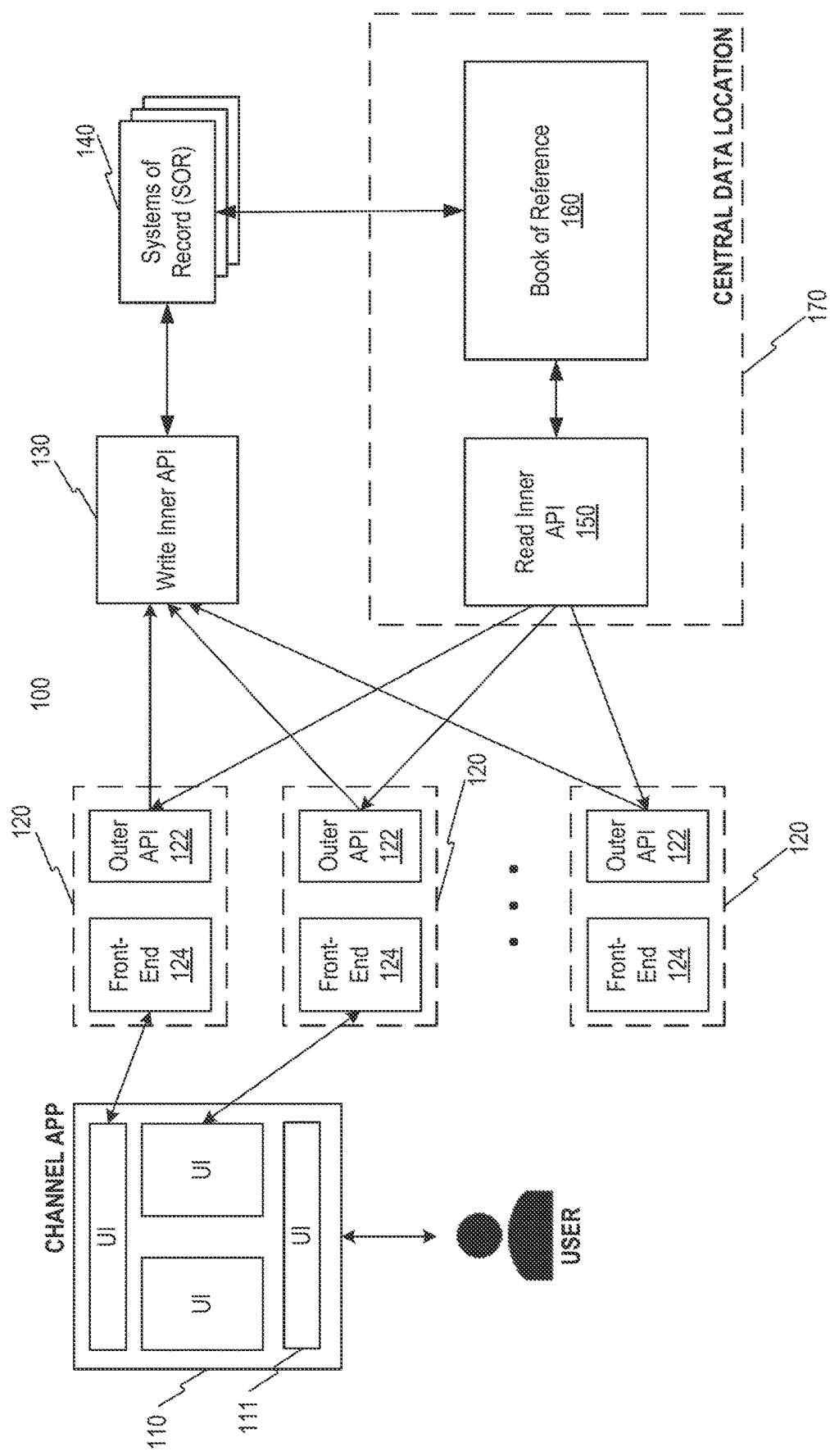
FIG. 1 is a schematic representation of an exemplary computer-implemented system for collecting and distributing digital experience information, according to embodiments of the present disclosure.

FIG. 1 is a schematic representation of exemplary computer-implemented systems 100 for collecting and distributing digital experience information, according to embodiments of the present disclosure. A computer-implemented system 100 for collecting and distributing digital experience information may comprise a computer-implemented system for developing digital experience applications, and a computer-implemented system for processing digital experience information.

System 100 may comprise one or more channel applications 110, also referred to as a "driver application", one or more micro-applications 120, one or more sets of write inner application programming interface (API) 130, one or more systems of record (SOR) 140, one or more sets of read inner API 150, and one or more systems of book of reference 160. In some embodiments, a system of book of reference may comprise a connector configured to receive information corresponding to the detected application events and application states and belonging to a category; an event backbone configured to route the information received by the connector based on the category; and a database configured to store the received information. The event backbone may be further configured to send information to the connector from the event backbone and the database based on one or more criteria. The plurality of micro-applications may be further configured to receive information belonging to the category from the connector.

In some embodiments, a channel application 110 may comprise one or more page components (not shown), configured to lay out and/or configure the micro-applications 120. Micro-applications 120 may each comprise one or more user interfaces 111 (UI) configured to enable and allow a user to view information or to interact with the system 100. In some embodiments, channel application 100 may be embodied as software stored in non-transitory computer-readable medium that when executed by a processor causes operations, functions, and results described herein to be realized A user may use a channel application 100 on a computer, mobile device (e.g., cellular phone, smart phone, tablet, personal digital assistant, smart appliance, kiosk, etc.), or other electronic device to review or interact with information, for example, with banking information relating to the user's bank account.

A micro-application 120 can be configured to perform one or more discrete functions (e.g., by using logic embodied in computer-readable and/or executable code). The micro-application 120 can comprise a front-end 124 (i.e. a user interface, which may be a graphical user interface) configured to receive input from a user (e.g., through buttons, or the like) and/or provide information to the user (e.g., through a display, or the like). For example, a micro-application may contain a front-end 124 created using Angular platform for receiving user input in the form of mouse-clicks on a browser. Front-end 124 may comprise the user interface 111 of channel application 110. The micro-application can comprise an outer interface 122 (e.g., an application programming interface (API), or the like) for receiving and sending information from and to the information processing system using the connector (e.g., using an external application programming interface (API), or the like). For example, a micro-application may contain an outer interface created using bootstrap, and the processing system may contain a corresponding external application interface for communicating with the outer interface. In some embodiments, the front-end and the outer interface may be deployed as a separate container in a container application (e.g., OpenShift Container Platform, or the like). The micro-application can further comprise an event manager (not shown) configured to send and receive event information to and from the information processing system, as well as a state manager (not shown) configured to send and receive state information to and from the information processing system. For example, in a financial setting, the event manager may publish information regarding business events such as financial transactions by a customer to the event backbone through a system of recording using a first external application programming interface (API), and the state manager may receive information regarding the customer's present account balance from the event backbone using a second external application programming interface (API). In this manner, the read and write functionality between micro-applications and the processing system may be scaled differently.

In some embodiments, a write inner API 130 may be configured to receive event information from one or more micro-applications. In some embodiments, the write inner API 130 may send the received event information to one or more systems of record (SOR) 140. SOR 140 may process the event information and update the information to the book of reference 160. In some embodiments, the write inner API 130 may be created using Micron framework.

In some embodiments, a read inner API 150 may send information to one or more micro-applications 120. A read inner API 150 may be created by exposing data in a data store. In some embodiments, the read inner API 150 may use an internal or external cache to speed API responses. In some embodiments, the read inner API 150 may be created using Micron framework. In some embodiments the read inner API 150 and book of reference 160 may be deployed as a central data location 170.

Figure 2:
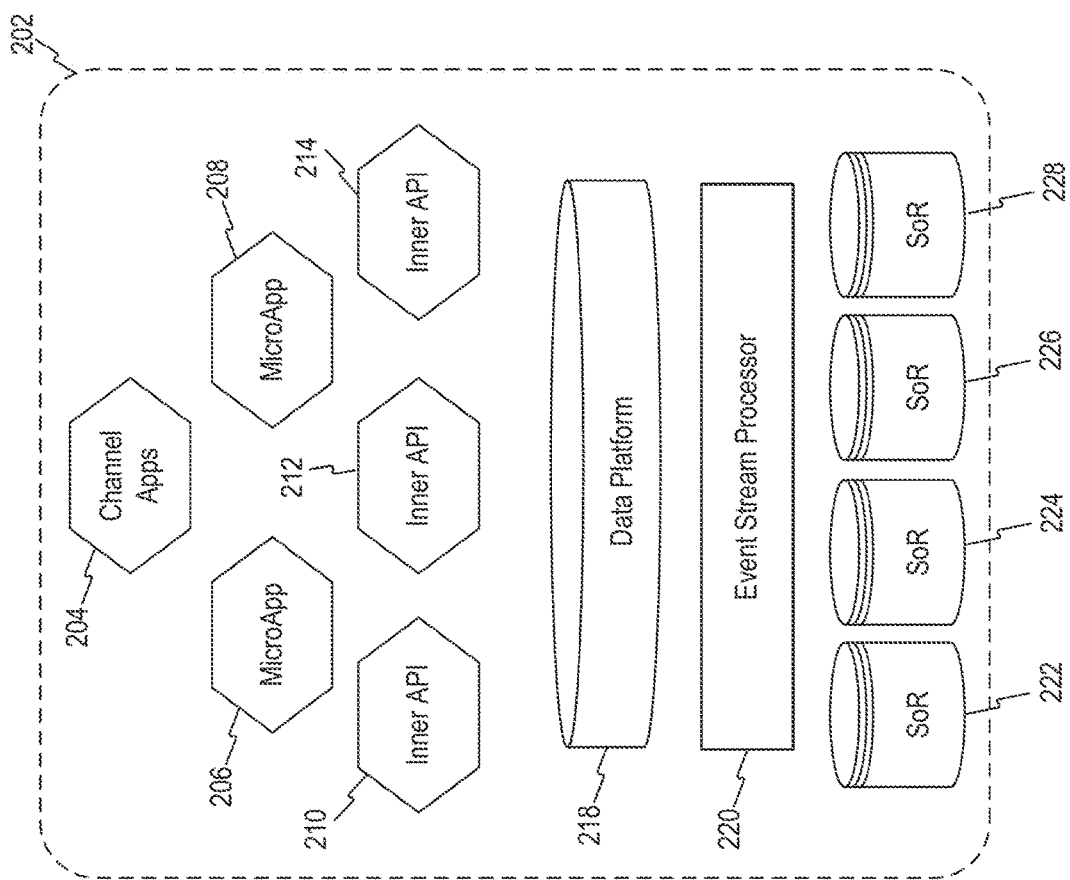
FIG. 2 is a schematic representation of an exemplary computer-implemented system for collecting and distributing digital experience information, according to embodiments of the present disclosure.

FIG. 2 is a schematic representation of an exemplary computer-implemented system 202 using a system for collecting and distributing digital experience information, according to embodiments of the present disclosure. As depicted in FIG. 2, the system 202 may comprise one or more channel applications 204. The system 202 may comprise a plurality of micro-applications 206 and 208. The plurality of micro-applications 206 and 208 may be configured to act as discrete functions of a user experience. The system 202 may comprise a plurality of inner APIs 210, 212, and 214. The inner APIs may be configured to individually receive from or send to one or more micro-applications event information. Information with different property may be processed via different inner API. The event stream processor 220 may comprise the system for processing digital experience information. The system 202 may comprise a plurality of SORs 222, 224, 226, and 228, each of which may be deployed outside a central data location. As can be appreciated from FIG. 2, a system for collecting and sharing digital experience information may include other components, such as one or more data platforms for data analytics and querying (e.g., using machine learning models, or the like), as well as one or more systems of record.

Figure 3:
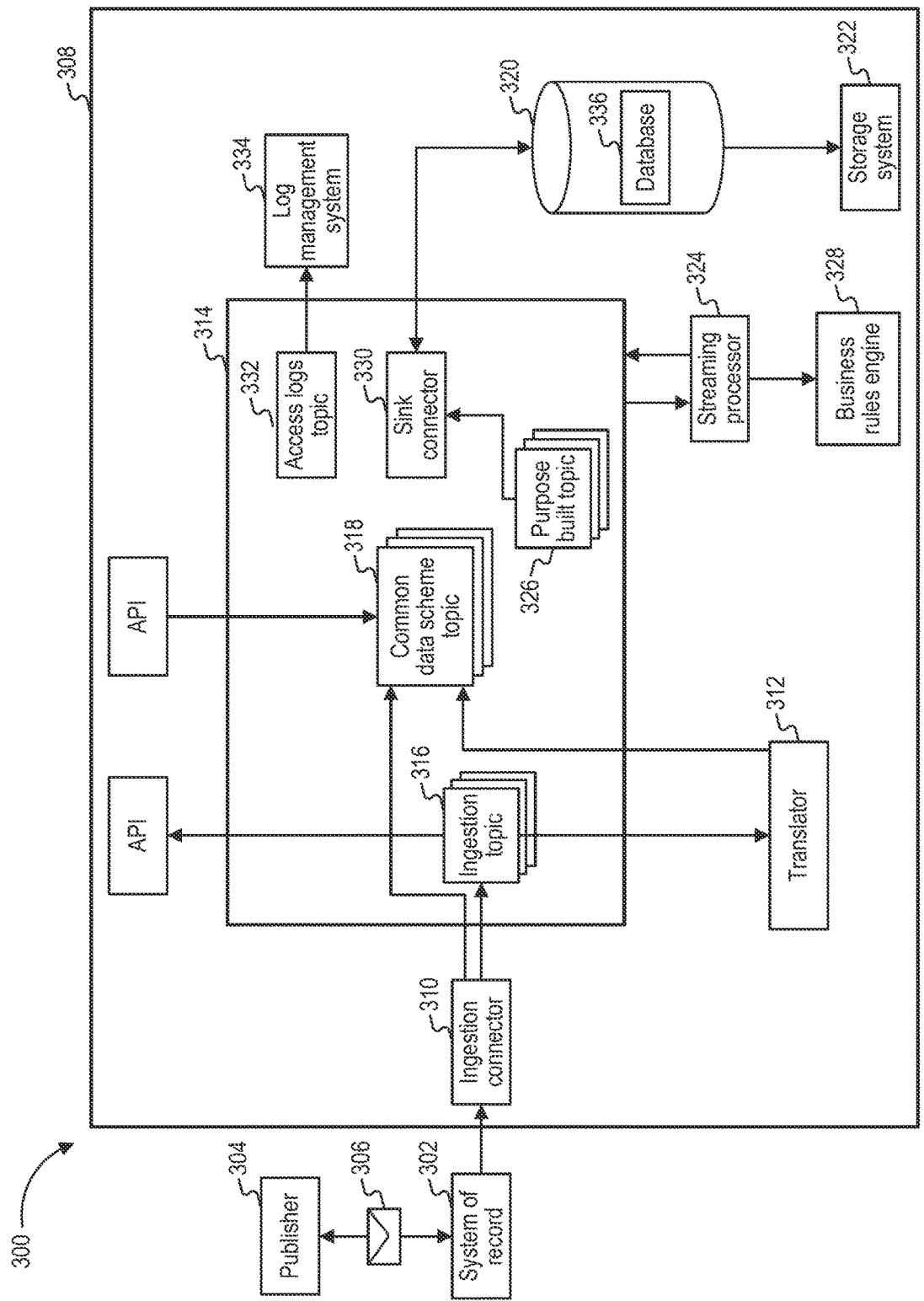
FIG. 3 is a schematic representation of another exemplary computer-implemented system for processing digital experience information in accordance with some embodiments.

FIG. 3 depicts an exemplary computer-implemented system 300 for processing digital experience information in accordance with some embodiments. The computer-implemented system 300 may create a book of reference that includes data for all types of events, such as banking or credit transactions. Such a book of reference may be a central data location and may be used, for example, by applications, including micro-applications, to read and write data.

The computer-implemented system 300 may comprise a system of record 302 configured to receive, from a publisher 304, a transactional event 306. The transactional event 306 may comprise transactional event data. The system 300 may comprise a central data location 308 communicatively connected to the system of record 302. The central data location 308 may comprise an ingestion connector 310 configured to receive the transactional event data from the system of record 302. The central data location 308 may comprise a translator 312 configured to transform the transactional event data from the ingestion connector 310 into a common data scheme. The common data scheme may be configured to allow integration between transactional events. For example, a transactional event of one type (e.g., a credit card payment) could be configured in the same data scheme as a transactional event of another type (e.g., a banking transfer), so that the transactional events can each be accessed by an application. The common data scheme may be BIAN (Banking Industry Architecture Network scheme).

The central data location 308 may comprise an event backbone 314 communicatively connected to the translator 312. The event backbone may comprise an ingestion topic 316. The event backbone 314 may comprise a common data scheme topic 318. The common data scheme topic 318 may comprise the transactional event data in the common data scheme received from the translator 312. When the ingestion connector 310 receives a transactional event 306 from the system of record 302, it may determine whether the transactional event 306 is in the common data scheme.

If the transactional event data in the transactional event 306 is not in the common data scheme, the ingestion connector 310 can determine to pass the transactional event 306 to the ingestion topic 316 in an ingestion topic message. The translator 312 may then read from the ingestion topic 316, translate the transactional event data in the transactional event 306 to the common data scheme and write to the common data scheme topic 318. The event backbone 314, therefore, may comprise the ingestion topic 316 comprising the transactional event data before it is transformed, by the translator 312, into the common data scheme.

If the transactional event data of the transactional event 306 is already in the common data scheme, the ingestion connector 310 may then write to the common data scheme topic 318 without translation by the translator 312.

The central data location 308 may include an event store 320 communicatively connected to the event backbone 314. The event store 320 may be configured to receive the ingestion topic 316 or common data scheme topic 318 from the event backbone 314. The event store 320 may be configured to store the topic in a storage system 322. The storage system 322 may be configured to allow an out-of-order query to modify query cost.

The central data location 308 may include a streaming processor 324 configured to stream the transactional event data to a subscriber. The streaming processor 324 may be configured to stream the transactional event in real-time. The streaming processor 324 may be configured to receive the transactional event data 306 from the event backbone. The event backbone 314 may be configured to receive the transactional event data from the event store 320. The streaming processor 324 may be configured to receive the transactional data from the event store 320. The event backbone 314 may be communicatively connected to the ingestion connector 310. The event backbone 314 may comprise a purpose-built topic 326 comprising a portion of the transactional event data that is not compliant with the common data scheme.

The central data location may comprise a business rules engine 328 configured to supply business rules to the streaming processor 324. The business rules engine 328 may externalize business rules from application code. The streaming processor 324 may be further configured to convert the transactional event data into the common data scheme using the business rules. The streaming processor 324 may comprise a business rule, and the streaming processor 324 may be further configured to convert the transactional event data into the common data scheme using the business rule.

The event backbone 314 may further comprise a sink connector 330 communicatively connected to the event store 320. The sink connector 330 may be configured to transform the transactional event data from topics 316, 318, or 326 into a query data scheme for storage in the event store 320. The sink connector 330 may be configured to write the topics 316, 318, or 326 to the event store 320. The sink connector 330 may be configured to transform the common data scheme topic 318 into a purpose-built topic. The topic may be a BIAN topic. The translator 312 may be configured to transform the transactional event data from the ingestion connector 310 into a BIAN-compliant data scheme.

The event backbone 314 may further comprise an access logs topic 332 communicatively coupled to a log management system 334. The access logs topic 332 may be configured to record access to the event backbone 314.

The event store 320 may be further configured to permanently store the transactional event 306. The event store 320 may comprise a database 336. The database 336 may be a relational database management system (RDBMS) database. The database 336 may be a NoSQL database.

Figure 4:
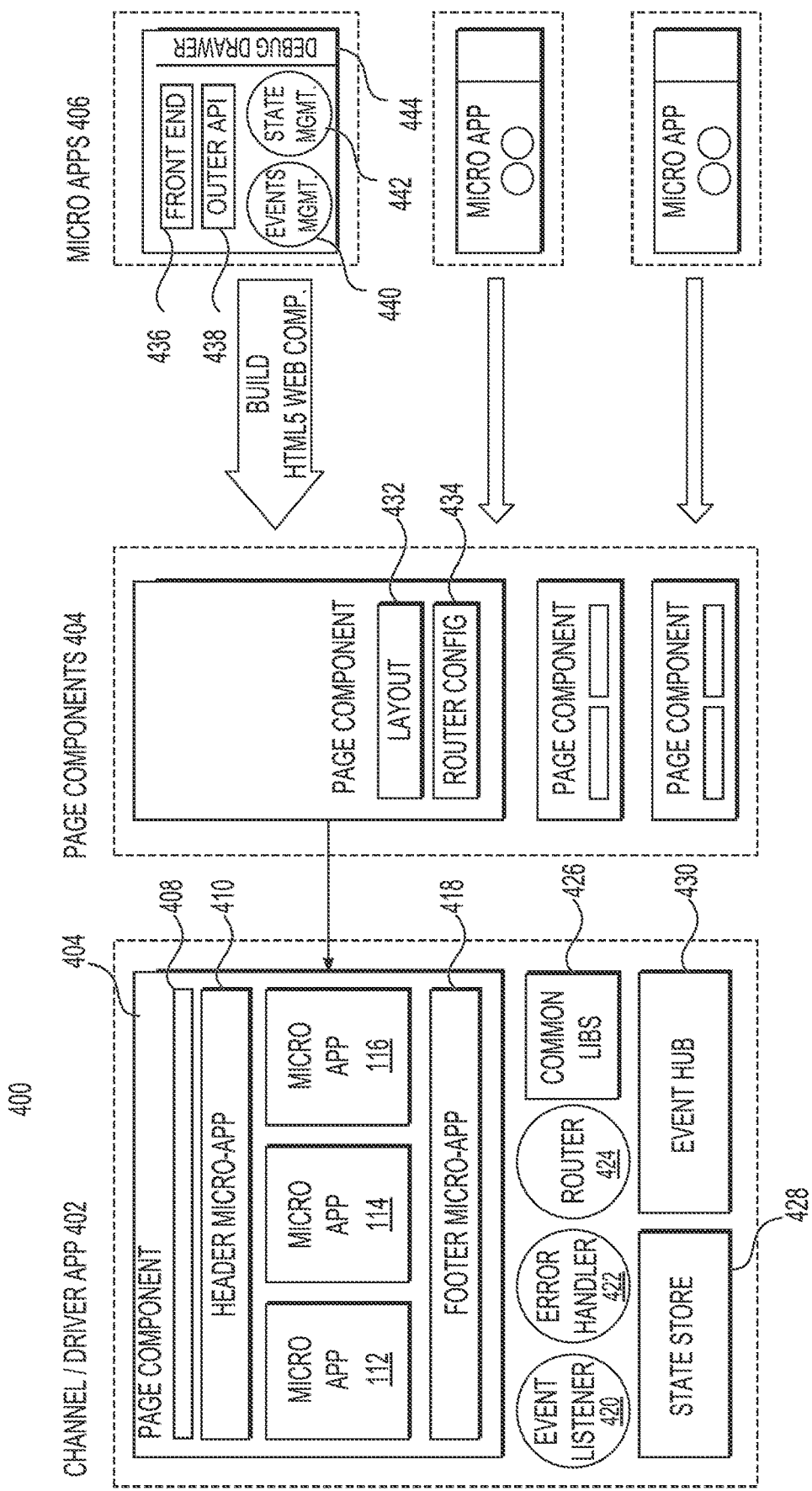
FIG. 4 is a schematic representation of an exemplary computer-implemented digital experience application comprising a plurality of micro-applications, according to embodiments of the present disclosure.

FIG. 4 is a schematic representation of an exemplary computer-implemented digital experience application 400. In accordance with disclosed embodiments, digital experience application 400 may comprise a plurality of micro-applications 406 configured to detect events relating to the application 400 (i.e., application events) and states relating to the application 400 (i.e., application states). The digital experience application 400 may include one or more driver applications 402 for hosting and managing the plurality of micro-applications 406. A driver application 402, also referred to as a "channel application," can include one or more page components 404 configured to lay out and route information to and from the plurality of micro-applications 406. The driver application 402 may also include one or more event hubs 430 configured to receive the detected application events from the plurality of micro-applications 406 and route the detected application events to the plurality of micro-applications 406 and/or other components of application 400. Driver application 402 may also include one or more state stores 428 configured to store the detected application states received from the plurality of micro-applications.

In some embodiments, the digital experience application 400 may comprise one or more event listeners 420 configured to respond when an event occurs in the plurality of micro-applications 406; one or more error handlers 422 configured to respond to error conditions in the plurality of micro-applications 406; one or more routers 424 configured to forward information received from the plurality of micro-applications 406; and one or more common libraries 426 comprising resources and/or functions used by the plurality of micro-applications 406. In various embodiments, the driver application 402 can be configured to provide information to the page component 404 for ensuring that the plurality of micro-applications 406 function and are displayed in a similar manner. For example, the driver application 402 can provide, to the page component 404, information corresponding to a common style scheme, which may include information relating to font styles, font size, buttons, links, and the like. In some embodiments, the information may relate to features for backwards compatibility, for example to provide backwards compatibility with older web browsers for displaying the application 400. This may include polyfill code or the like to allow developers to use an interface or feature of application 400 whether it is supported by a browser or not.

A page component 404 may include router configuration information 434 so that page component 404 may be configured to represent or act as a route in the driver application 402 and host a micro-application 406 corresponding to that route. For example, if a user interacts with a micro-application 406, the page component 404 may be configured to send data corresponding to that user interaction to the driver application 402. As another example, a user may interact with a micro-application on a first page component which may act as a route to send data corresponding to that user interaction to a second page component (enabling page routing). A page component 404 may include layout 432 providing information configured to specify the layout of the micro-application 406. To illustrate using FIG. 4 as an example, layout 432 may include information such that page component 404 may be configured to position a first micro-application 406 at the top of the page component 404, corresponding to a navigation bar micro-application 408 in this example (e.g., a micro-application configured to navigate from the page component); position a second micro-application, corresponding to a header micro-application 410 in this example, below the first micro-application 408 (e.g., a header micro-application containing a welcome banner); position a third micro-application, corresponding to a footer micro-application 418 in this example, at the bottom of the page component 404 (e.g., a footer micro-application containing data of a business or copyright information); and position fourth, fifth, and sixth micro-applications (412, 414, 416) between the header micro-application 410 and footer micro-application 418 (e.g., a deposit account summary micro-application for displaying to a user all deposit accounts related to the user).

In some embodiments, driver application 402 aggregates a plurality of micro-applications 406 to develop the user experience of the application 400. This framework enables application developers to build applications, such as application 400, using small, discrete pieces (i.e., the micro-applications). In some embodiments, the driver application 402 comprises a Single Page Application (SPA), which may be developed, for example, using the Angular platform. A micro-application 406 can be configured to perform one or more discrete functions, for example using functional logic. The micro-application 406 may represent an independent vertical slice of the business functionality provided by the application 400. The micro-application 406 can comprise a front-end 436, (i.e. a user interface, such as a graphical user interface or "GUI") configured to interface with a user by receiving input information from the user and/or providing information to the user. For example, a micro-application 406 may contain a front-end 436 for receiving user input in the form of a mouse-click on a browser, interaction with a button, touch screen, touch panel, keyboard input, or the like. Front end 436 may also provide information to the user through a display or the like. The front-end 436 of the micro-application 406 may be created using a front-end web platform for building mobile and desktop web applications, such as the Angular platform. In some embodiments, as shown in FIG. 4, micro-application 406 may be loaded onto the page component 404 and to the driver application 402 using a web platform such as HTML5 web component technology or the like.

In some embodiments, the micro-application 406 may comprise an outer interface 438 (also referred to as a back end) corresponding to the front end 436 of the micro-application 406. The outer interface 438 may be configured for receiving information from and sending information to a component or source outside the driver application 402. For example, the outer interface 438 may be configured for receiving information from a database. In some embodiments, the outer interface 438 may be an application programming interface (API). The outer interface 438 may route information to and from an Inner API, as disclosed in Provisional U.S. Patent Application Ser. No. 62/983,535, the contents of which are incorporated herein. The micro-application 406 may contain an outer interface 438 developed using spring boot or Bootstrap framework. In some embodiments, the front-end 436 and the outer interface 438 of a micro-application 406 may be deployed as a separate container, such as a docker container, in a container application, such as OpenShift Container Platform (OCP), or the like. This enables the micro-application 406 to run quickly and reliably from one computing environment to another.

In some embodiments, the micro-application 406 can further comprise an event manager 440 configured to send and receive event information. For example, event manager 440 may be configured to detect an application event belonging to a category and transmitting the detected application event. The detected application event may be transmitted to event hub 430, for example. The micro-application 406 can further comprise a state manager 442 configured to send and receive state information. For example, state manager 442 may be configured to detect an application state belonging to a category and transmitting the detected application state. The detected application event may be transmitted to state store 428, for example, for storage. In some embodiments, the micro-application can further comprise a debug drawer 444 configured to capture and replay events as a part of the micro-application communication.

In some embodiments, a micro-application 406 may not include an outer interface 438. Here, a micro-application 406 without an outer interface 438 may be configured to listen for events and state changes from other micro-applications. For example, a first micro-application may send event information to event hub 430 and state information to state store 428. A second micro-application configured to listen for events and state changes from first micro-application, or alternatively, the events and state changes belonging to a specific category, may then receive the event information from event hub 430 and state information from state store 428.

Event hub 430 can be configured to route event information to and from the plurality of micro-applications 406 and/or the driver application 402. The plurality of micro-applications 406 and/or the driver application 402 can be configured to transmit or receive event information to and/or from the event hub 430 as a result of or in response to a user input or other user interaction with micro-applications 406. Alternatively or additionally, the plurality of micro-applications 406 and/or the driver application 402 may be configured to transmit or receive event information to and/or from the event hub 430 as a background process. Accordingly, micro-applications 406 and/or the driver application 402 may publish events in response to either a user interaction or a background process. In some embodiments, event hub 430 may be integrated into the driver application 402. The event hub 430 may be configured to route information based on one or more criteria. For example, the event hub 430 may be configured to route event information from a first source to a first set of micro-applications, and it may be configured to route event information from a second source to a second set of micro-applications. The event hub 430 may route or filter the event information from the first and second sources using a source identification value emitted by the source.

In some embodiments, micro-applications 406 and/or driver application 402 may "subscribe" to receiving event information. For example, micro-applications 406 and/or driver application 402 may be subscribed to receiving event information from a specific source. In this case, the event hub 430 may be configured to route event information only to micro-applications 406 or driver application 402 subscribed to receiving information from the specific source before the event occurs. In some embodiments, a micro-application 406 or driver application 402 may be late in subscribing to receive the event information from the source before the event occurs. In this case, the micro-application 406 or driver application 402 that subscribes late does not receive the event information. In some embodiments, the event hub 430 may be configured to route "special" event information differently, such as for navigating the driver application 402 to a different page, as described in further detail below. In some embodiments, the event hub 430 can be configured to be a singleton, such that only a single instance of the event information is relayed. In this manner, the system can ensure that only correct and up-to-date event information is transmitted.

In some embodiments, state store 428 may be integrated into the driver application 402. State store 428 can be configured to store state information relating to application 400. The state store 428 may comprise a database, server, local storage, or the like. For example, state store 428 may comprise in-browser memory, with state information being stored as an object, such as a JavaScript Object Notation (JSON) object. The state store 428 can be further configured to route state information to and/or from the plurality of micro-applications 406 and/or the driver application 402. The plurality of micro-applications 406 and/or the driver application 402 can be configured to transmit or receive state information to and/or from the state store 428 as a result of or in response to a user input or other user interaction with micro-applications 406. Alternatively or additionally, the plurality of micro-applications 406 and/or the driver application 402 may be configured to transmit or receive state information to and/or from the state store 428 as a background process. Accordingly, micro-applications 406 and/or driver application 402 may update the application state of application 400.

In some embodiments, similar to the event hub 430 described above, state store 428 can be further configured to route state information based on one or more criteria. For example, the state store 428 may be configured to route state information from a first source to a first set of micro-applications, and may route state information from a second source to a second set of micro-applications. The state store 428 may route the state information from the first and second sources using a source identification value emitted by the source. In some embodiments, micro-applications 406 and/or driver application 402 may "subscribe" to receiving state information. For example, micro-applications 406 and/or driver application 402 may be subscribed to receiving state information from a specific source. In this case, the state store 428 may be configured to send state information only to micro-applications 406 or driver application 402 subscribed to receiving state information from the specific source before the state changes. In some embodiments, a micro-application 406 or driver application 402 may be late in subscribing to receive the state information from the source. In this case, the micro-application 406 or driver application 402 that subscribes late does not receive the state information. In some embodiments, the state store 428 can be configured to be a singleton, such that only a single instance of the state information is relayed. In this manner, the system can ensure that only correct and up-to-date state information is transmitted, as the state store 428 acts as the single source of truth. In various embodiments, the state store 428 can be configured to automatically transmit state information to new micro-applications 406 that are added to the driver application 402 and/or the digital experience application 400.

Event Hub for Routing Event Information

Figure 5:
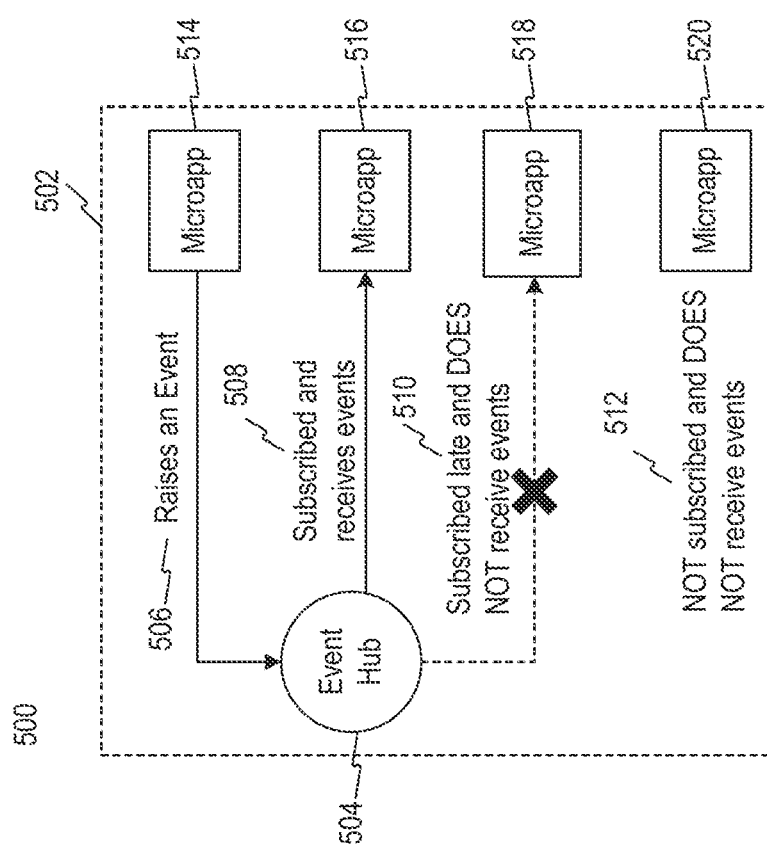
FIG. 5 is a schematic representation of an exemplary computer-implemented event hub for routing event information of a digital experience application, according to embodiments of the present disclosure.

FIG. 5 is a schematic representation of an exemplary computer-implemented event hub for routing event information of a digital experience application, according to embodiments of the present disclosure. Digital experience application 500 may include a driver application 502. Driver application 502 may integrate event hub 504 and host a collection of micro-applications, such as micro-applications 514, 516, 518, and 520. The functional behavior of the micro-applications 514, 516, 518, and 520 may be governed by events, with each micro-application acting as an independent functional unit. In some embodiments, event hub 504 may be configured as a singleton instance such that only a single instance of the event information is relayed. This enables coordinated actions across the system with event hub 504 serving as a communication hub that enables micro-applications 514, 516, 518, 520 and driver application 502 to publish events. Event hub 504 may be configured to receive event information from one or more micro-applications 514, 516, 518, and 520 and then route the received event information to one or more micro-applications 514, 516, 518, and 520 or other components or micro-applications. The event hub 504 may be configured to route event information based on one or more criteria. For example, the criteria may relate to subscriptions, a category of information, or a source of information.

As depicted in FIG. 5, a first micro-application 514 may raise an event at 506, for example, in response to a user interaction or background process. Micro-application 514 may transmit event information for the raised event to the event hub 504. The event information may belong to a category. For example, the event information may belong to a category relating to balances for deposit accounts. Event hub 504 may be configured to determine where to route the event information received from micro-application 514. For example, event hub 504 may be configured to determine if one or more micro-applications have subscribed to receive events. For example, event hub 504 may determine that micro-application 516 is subscribed to receive events belonging to the category of event information received from micro-application 514. For example, event hub 504 may consult a data storage component, such as a lookup table or other memory structure, to determine whether subscriptions exist. Alternatively or additionally, event hub 504 may determine that micro-application 516 is subscribed to receive events raised from a particular source, such as micro-application 514. At 508, event hub 504 determines that micro-application 516 is subscribed to receive events, for example, belonging to a category relating to balances for deposit accounts. In response, event hub 504 routes the event information received from micro-application 514 to micro-application 516. In some instances, event hub 504 may route the event information based on a source identification value emitted by micro-application 514. For example, event hub 504 may determine that micro-application 516 is subscribed to events raised by micro-application 514. Here, event hub 504 routes the event information to micro-application 516 using the source identification value emitted by micro-application 514.

In some instances, a micro-application may not be subscribed to receive events. For example, micro-application 520 is not subscribed to receive events and will not, at 508, receive events from event hub 504. In some instances, a micro-application 518 may have subscribed late, for example, after the event has already been raised by micro-application 514, and may not receive events, at 510, from event hub 504. In some embodiments, a driver application, such as driver application 502, may be subscribed to receive event information from a micro-application in the same manner as subscribed micro-application 516, as described above. In this instance, event hub 504 determines that driver application 502 is subscribed to receive event information from micro-application 514, and transmits the event information received to driver application 502.

Figure 6:
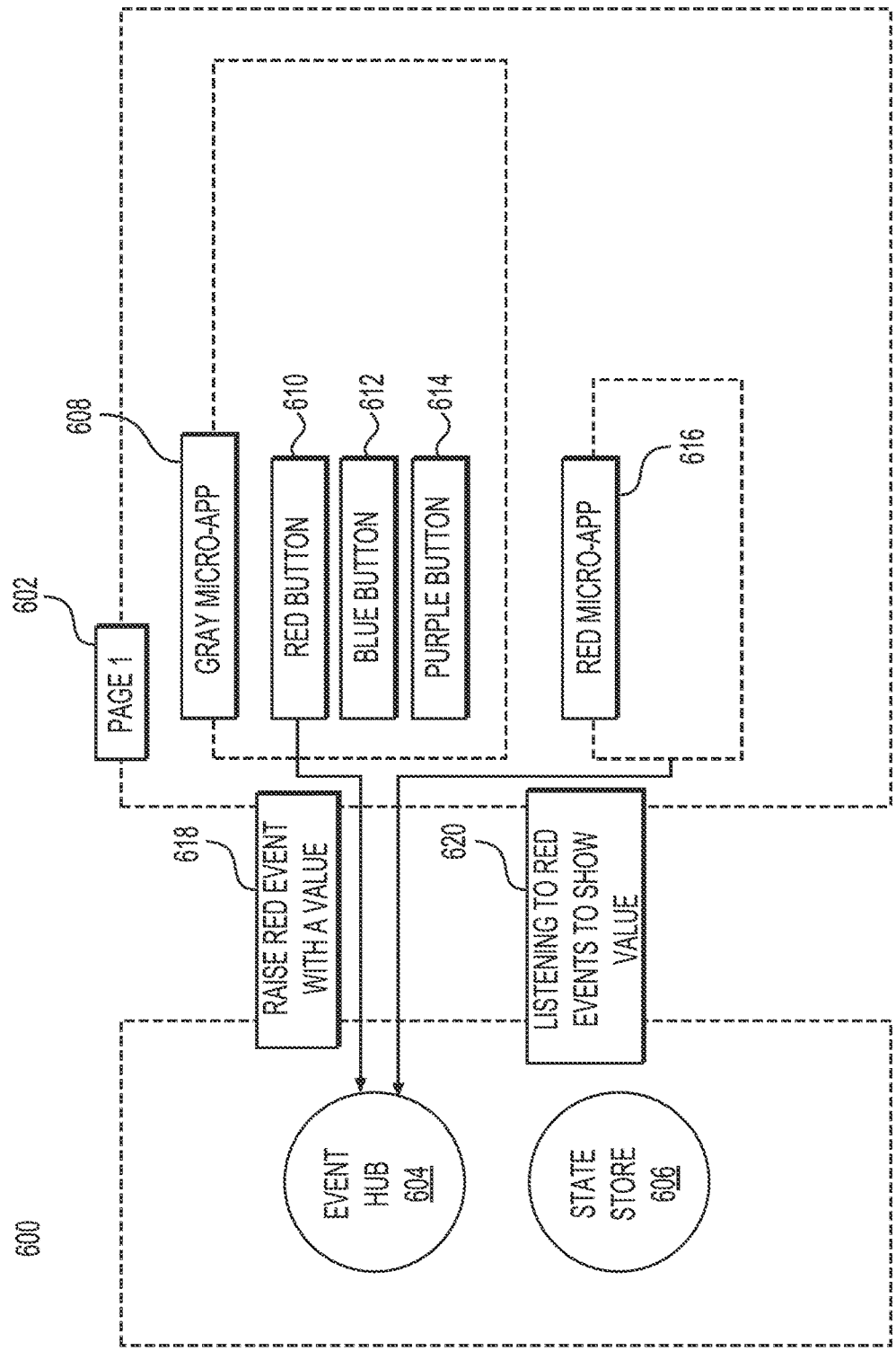
FIG. 6 is a schematic representation of an exemplary embodiment depicting an event hub enabling communication between micro-applications to share event information according to embodiments of the present disclosure.

FIG. 6 is a schematic representation of an exemplary embodiment depicting an event hub enabling communication between micro-applications to share event information. Micro-applications may publish events in response to a user interaction or a background process. Application 600 may include a driver application comprising a page component 602 that may host gray micro-application 608 and red micro-application 616. The driver application may also include an event hub 604 and state store 606. Gray micro-application 608 may include a front-end interface depicting three buttons: red button 610, blue button 612, and purple button 614. At step 618, gray micro-application 608 may trigger or detect an event (i.e. "red" event) as a result of a user interaction with red button 610. Gray micro-application 608 may transmit event information (containing a value) relating to the interaction with red button 610 (i.e., "red" event information) to event hub 604. Event hub 604 may be configured to route event information based on one or more criteria, as described above. Event hub 604 may determine that red micro-application 616, at step 620, is subscribed to listen for event information belonging to a category, such as red events. Event hub 604 may then route the red event information to red micro-application 616 based on the determination. In this way, a subscribing micro-application may receive event information originating from gray micro-application 608.

State Store for Updating and Storing Application States

Figure 7:
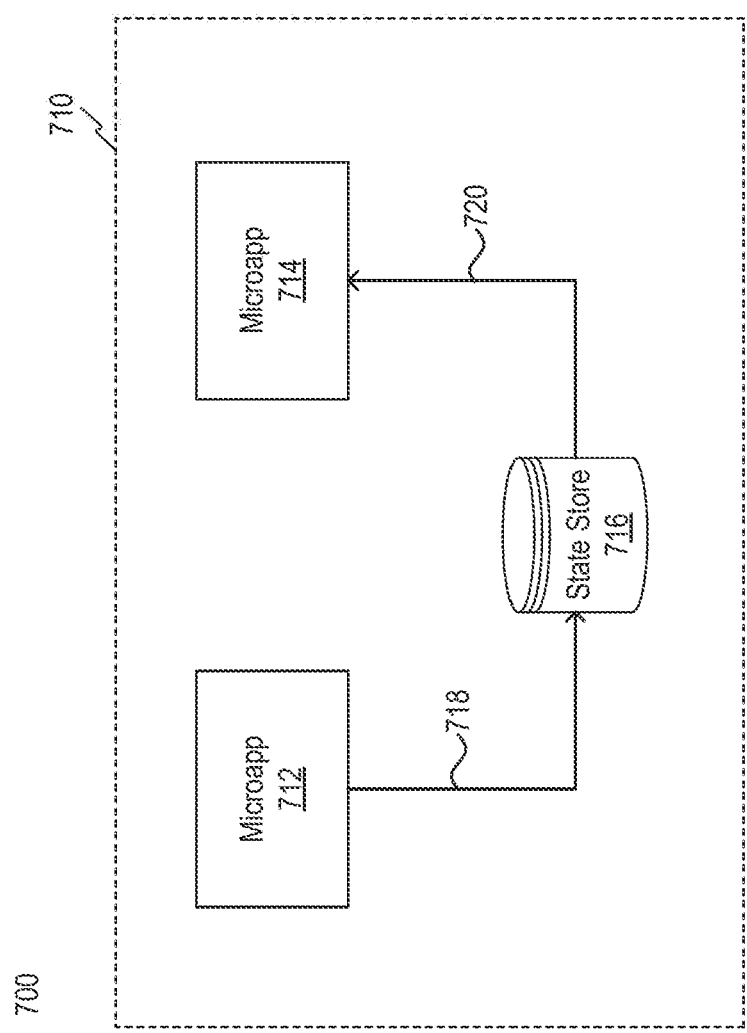
FIG. 7 is a schematic representation of an exemplary computer-implemented state store for storing state information of a digital experience application, according to embodiments of the present disclosure.

FIG. 7 is a schematic representation of an exemplary computer-implemented state store for storing state information of a digital experience application 700, according to embodiments of the present disclosure. Driver application 710 may include a first micro-application 712, a second micro-application 714, and a state store 716. The state store 716 may be configured to route state information based on one or more criteria. For example, the criteria may relate to subscriptions, a category of information, or a source of information. As depicted in FIG. 7, micro-application 712 may send state information at step 718 to the state store 716. The state information may be sent as a result of a user interaction or background processes. The state information may belong to a category. For example, the state information may belong to a category relating to account deposits. At step 718, micro-application 712 may update the state belonging to the deposit category and send the updated state information to state store 716 for storage. State store 716 may comprise a database, server, local storage, in-browser memory, or other memory structures for storing state information.

In a similar fashion as with event hub, the state store 716 may be configured to send the state information to micro-applications that have subscribed to indicate they wish to receive state information belonging to a specific category.

State store 716 may determine that micro-application 714 is subscribed to listen to state information, such as state changes, belonging to the deposit category. For example, state store 716 may consult a data storage component, such as a lookup table or other memory structure, to determine whether subscriptions exist. Alternatively or additionally, state store 716 may determine that micro-application 714 is subscribed to receive state changes transmitted from a particular source, such as micro-application 712. State store 716 then routes the state information received from micro-application 712 to micro-application 714. In some instances, state store 716 may route the state information based on a source identification value emitted by micro-application 712. For example, state store 716 may determine that micro-application 712 is subscribed to state changes provided by micro-application 712. Here, state store 716 routes the state information to micro-application 714 using the source identification value emitted by micro-application 712.

Dynamic Loading of Micro-Applications

Figure 8:
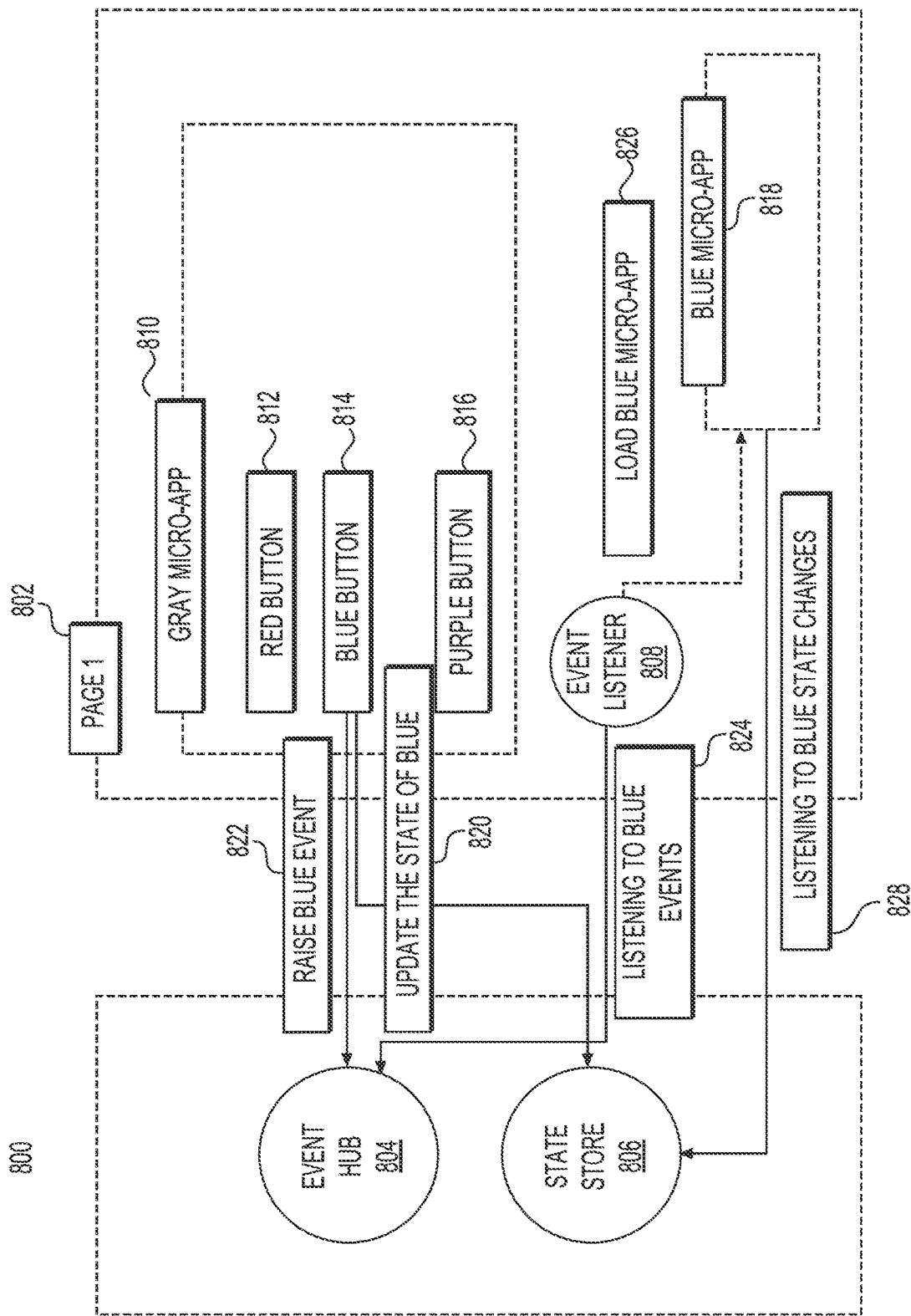
FIG. 8 is a schematic representation of an exemplary method for dynamically loading a micro-application according to embodiments of the present disclosure.

FIG. 8 is a schematic representation of an exemplary method for dynamically loading a micro-application, according to embodiments of the present disclosure. Here, an event hub and state store may enable communication with a first micro-application to dynamically load a second micro-application. Application 800 may include a driver application hosting gray micro-application 810 and blue micro-application 818 within a page component 802. In some embodiments, driver application may load gray micro-application 810 such that it is accessible within application 800, without loading blue micro-application 818. Driver application may also include an event hub 804, state store 806, and event listener 808. Gray micro-application 810 may include a front-end interface depicting three buttons: red button 812, blue button 814, and purple button 816.

As an exemplary first step 820, gray micro-application 810 may trigger or detect a state change belonging to a category, for example a "blue" category. The state change may be triggered or detected as a result of a user interaction with blue button 814 or alternatively, as a result of a background process related to blue button 814. Gray micro-application 810 may transmit state information (containing a value) relating to the interaction with blue button 814 (i.e., "blue" state information) to state store 806. State store 806 may be configured to store the blue state information and/or update previously stored blue state information. At step 822, gray micro-application 810 may trigger or detect an event associated with the state change (i.e. a "blue" event) as a result of the user interaction with blue button 814. Gray micro-application 810 may transmit event information, containing a value (i.e., "blue" event information) associated with the state change to event hub 804. Event listener 808 may be configured to listen for events belonging to a category, such as blue events. Event listener 808 may be subscribed to receiving event information belonging to the category of blue events. Event hub 804 may determine that event listener 808 is subscribed to listen for event information belonging to a category of blue events. At step 824, event hub 804 may then route the blue event information to event listener 808 based on the determination.

Event listener 808 may be configured to respond or perform an action based on receiving the blue event information from event hub 804. For example, at step 826, event listener 808 may communicate with driver application to generate or load blue micro-application 818. Blue micro-application 818 may be configured to listen to state changes belonging to a category. At step 828, state store 806 may determine that blue micro-application 818 is subscribed to listen for state information belonging to the blue category, such as blue state changes. State store 806 may then route the stored blue state information to blue micro-application 818. In this way, newly loaded blue micro-application 818 is updated with the latest blue state information.

Navigation Between Page Components

Figure 9:
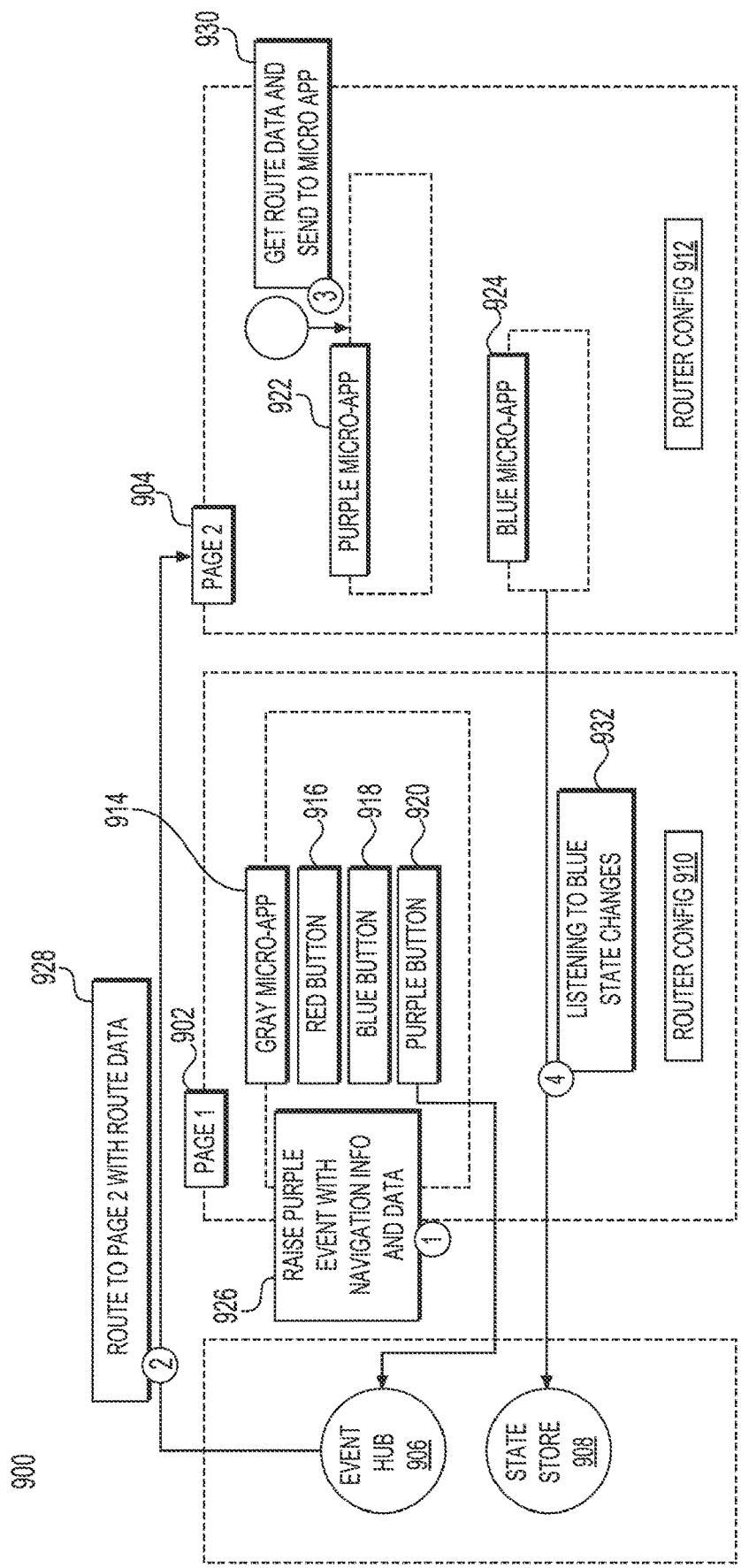
FIG. 9 is a schematic representation of an exemplary method for navigating between page components.

FIG. 9 is a schematic representation of an exemplary method for navigating from one-page component to another page component, consistent with embodiments of the present disclosure. In some embodiments, page component may be responsible for handling navigation between pages. In some embodiments, an application may include multiple page components, wherein some page components are visible to the user while other page components are not visible to the user. Here, the user may navigate from one-page component (for example, a visible page component) to another page component that was previously hidden from view. As depicted in FIG. 9, application 900 may include a driver application comprising a first page component 902 including gray micro-application 914. Gray micro-application may include a front-end interface depicting three buttons: red button 916, blue button 918, and purple button 920. Page component 902 may also include router configuration information 910 so that page component 902 may be configured to act as a route in the driver application. Driver application may comprise a second page component 904 including purple micro-application 922 and blue micro-application 924. Page component 904 may also include router configuration information 912. Driver application may also comprise an event hub 906 and state store 908.

Gray micro-application 914 may trigger or detect an event (e.g., a "purple" event) as a result of a user interaction with purple button 920 or alternatively, as a result of a background process related to purple button 920. At step 926, gray micro-application 914 may transmit event information, containing a value, relating to a category to event hub 906. For example, gray micro-application 914 may transmit purple event information relating to the interaction with purple button 920 to event hub 906. In addition to purple event information, gray micro-application 914 may transmit navigation information to event hub 906 relating to the purple event. In some instances, the navigation information may be retrieved from router configuration information 910. Event hub 906 may be configured to route event information based on one or more criteria, as described above. At step 928, event hub 906 may route purple event information to a second page component 904 based on the navigation information. At step 930, page component 904 may receive purple event information and transmit it to purple micro-application 922 based on the navigation information. For example, purple micro-application 922 may be subscribed to receiving events belonging to the purple category or events belonging to a source such as gray micro-application 914. In some instances, router configuration information 912 may receive or store the navigation information received.

At step 924, blue micro-application 924 within second page component 904 may, as a result of the purple event information, receive state information from state store 908. For example, blue micro-application 924 may be subscribed to listen to state information belonging to a blue category (i.e. blue state information). As a result of the purple event information received at purple micro-application 922, state store 908 may be configured to transmit updated blue state information to blue micro-application 924.

Developer Utility and Tool Kit

Figure 10:
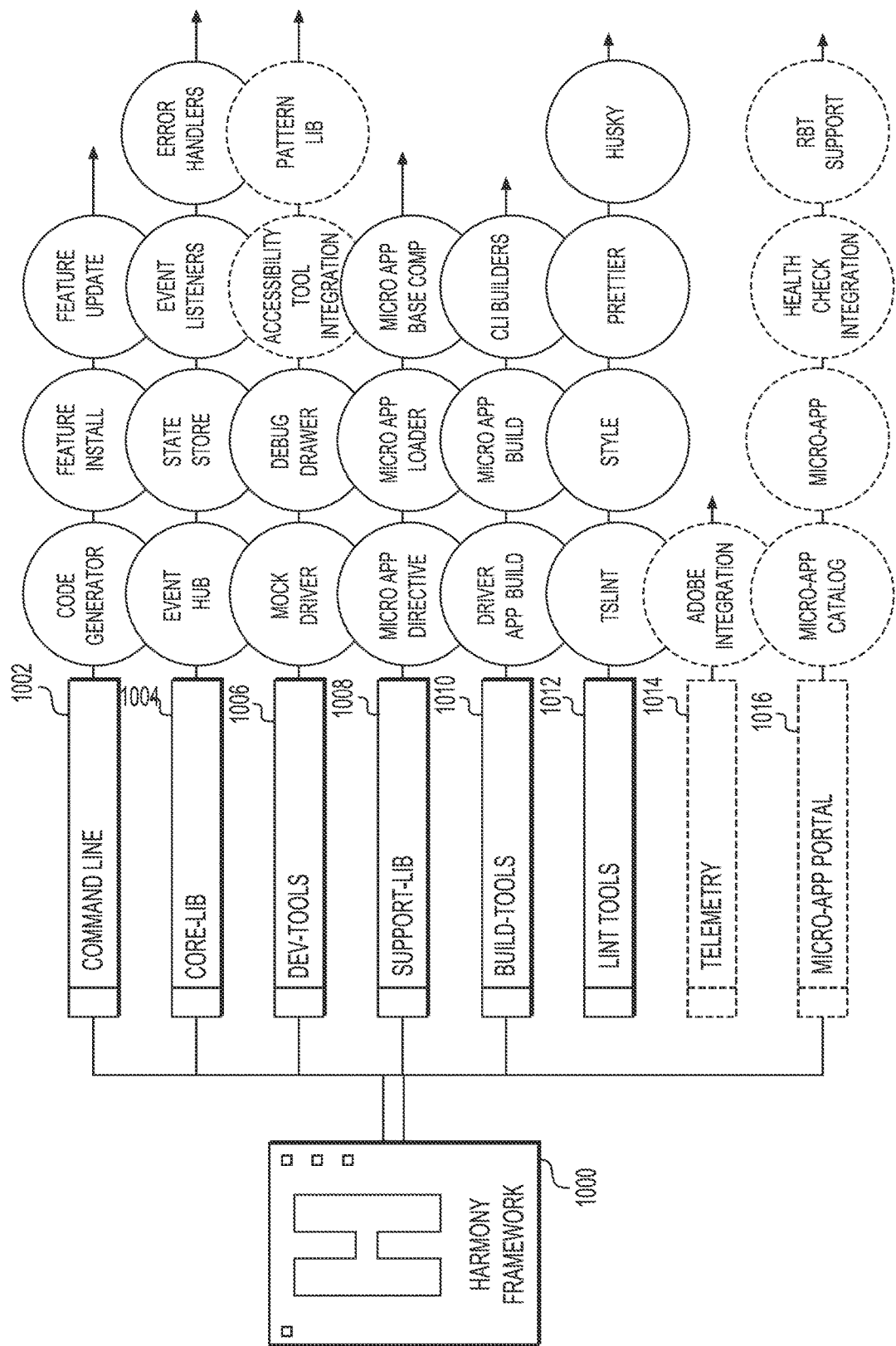
FIG. 10 is a schematic representation of a computer-implemented system for developing digital experience applications according to embodiments of the present disclosure.

FIG. 10 is a schematic representation of a computer-implemented system for developing digital experience applications, according to embodiments of the present disclosure. Framework 1000 provides developers with a common user interface framework enabling development of consistent and standard digital experience applications. Framework 1000 may provide developers with the toolkit, components, and libraries to ensure proper automated testing, debug and build patterns. For example, framework 1000 ensures applications may be built to architecturally approved standards. Framework 1000 provides benefits over prior frameworks, as the framework enables scaffolding based on conventions, code standardization, reinforces best practices and code quality through linting rules, provides an enhanced developer experience, enables a custom build process to optimize a bundle size based on local or production deployment, and standardizes the communication pattern through the use of an event hub and a state store.

Framework 1000 may comprise a command line interface (CLI) 1002, a core library 1004, developer tools 1006, support library 1008, build tools 1010, lint tools 1012, telemetry 1014, and micro-application portal 1016. CLI 1002 is a command line tool for managing development of an application. CLI 1002 may comprise commands for generating, installing, and updating features. An example of CLI 1002 is illustrated in FIG. 11.

Figure 11:
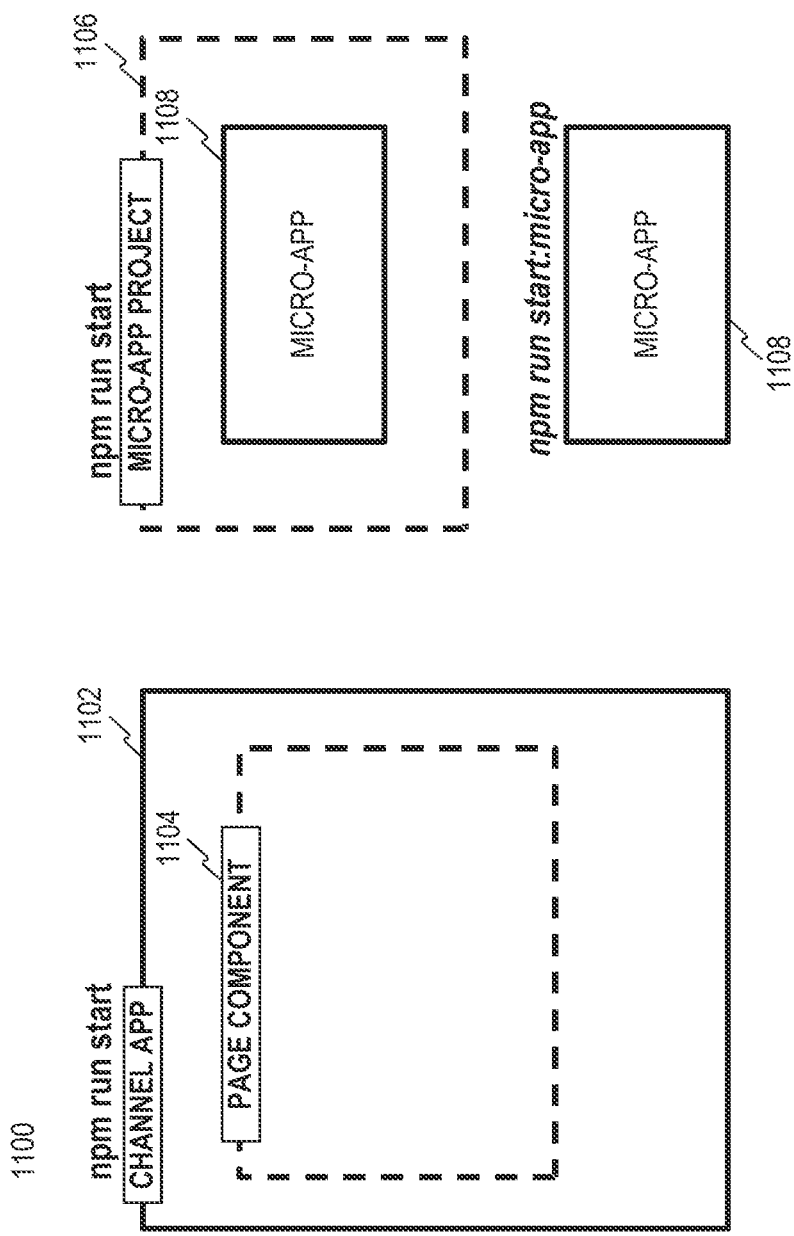
FIG. 11 is a schematic representation of an exemplary command line interface according to embodiments of the present disclosure.

FIG. 11 is a schematic representation of an exemplary command line interface, such as CLI 1002. CLI 1100 provides a developer-friendly utility for enforcing consistency and standardization during the development process. The framework enables developers to visualize the driver application and micro-application interactions. The framework provides functions for creating a new application, for example, by providing a developer the ability to perform the following functions: create a driver application, such as driver application 1102; create a new micro-application 1108 using the micro-ap[plication project 1106; build and serve the micro-application 1108; create a page component such as page component 1104 within driver application 1102; and append the new micro-application 1108 to the driver application 1102.

Returning to FIG. 10, core library 1004 may comprise a library to create an event hub, a state store, an event listener, an error handler, and other components of a driver application. Developer tools 1006 may comprise a mock driver to be used as a test container, a debug drawer to capture and replay events as part of communications of a micro-application, accessibility tool integration, a pattern library, or the like. Support library 1008 may comprise a library to provide easy access to life cycle methods of micro-applications, destroy and clean up micro-applications after use, generate error templates, generate load cursors, or the like. Support library 1008 may provide common functionalities and best practices to be followed by a developer. Support library 1008 may also comprise a library to eager or lazy load micro-applications. For example, lazy loading is a process for speeding up application load time by splitting the application into multiple bundles and loading them on demand (i.e. at run time). In this way, dependencies may be lazy loaded on an as-needed basis rather than eager-loaded, which requires the dependencies or components be loaded on launch.

Build tools 1010 may comprise tools to build a driver application, create a page component, create a micro application, append a micro-application to a page component, for example. Lint tools 1012 may comprise tools enabling automatically integrating standard rules and best practices for the programming language being used and other programming information such as TSLint, Stylelint, Prettier, Husky, or the like. Telemetry 1014 may comprise integration such as Adobe integration. Micro-application portal 1016 may comprise a micro-application catalog, micro-application preview, health check integration, RBT support, or the like. In some embodiments, libraries may be externalized so that they may be changed without impacting the development of micro-applications.

Figure 12:
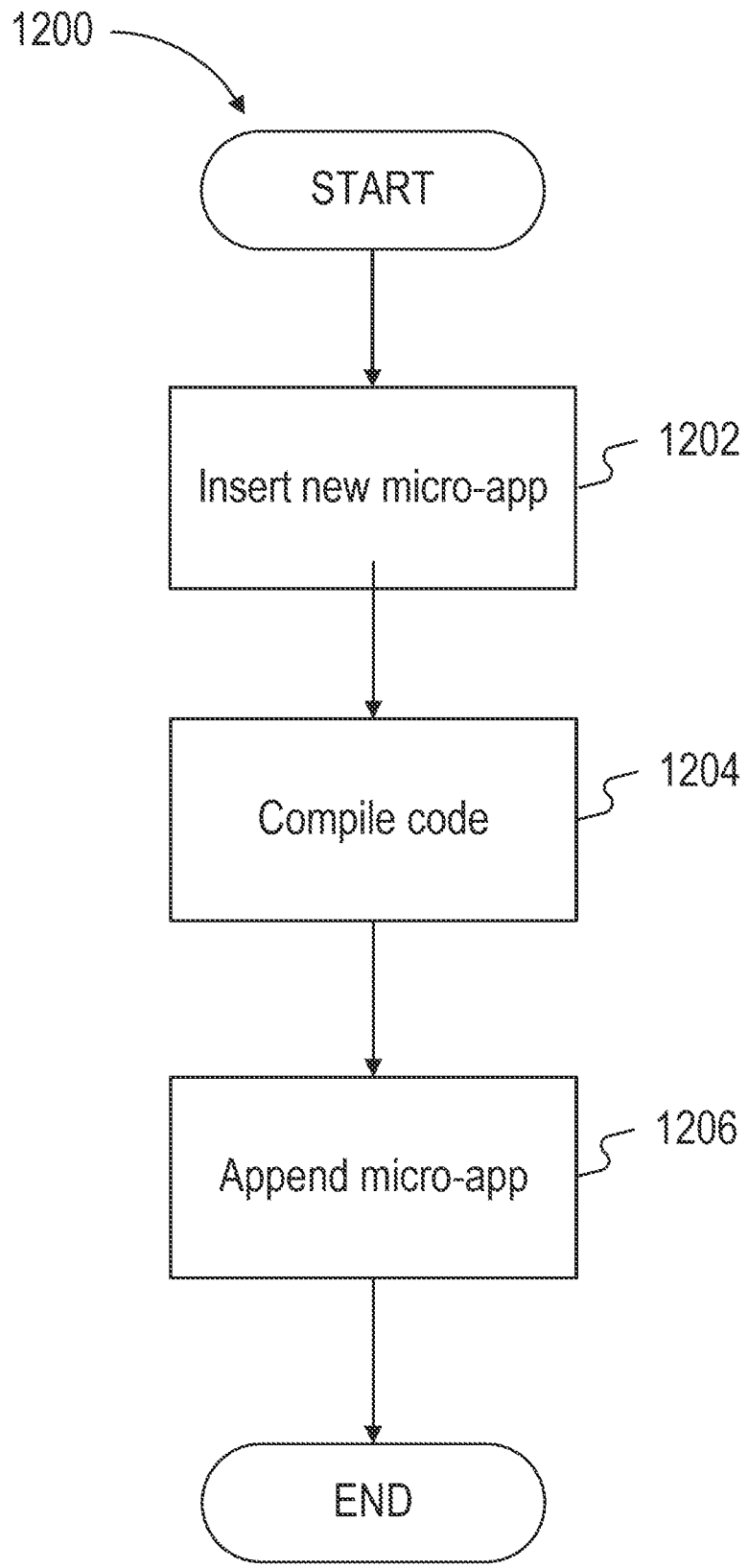
FIG. 12 is an exemplary method of creating a micro-application using a developer utility according to embodiments of the present disclosure.

FIG. 12 is an exemplary method of creating a micro-application using a developer utility, according to embodiments of the present disclosure. The developer utility enables a developer to build, test, and deploy (i.e., insert) new micro-applications within a driver application. Method 1200 begins at step 1202. Step 1202 may include performing a "new" CLI command to insert a new micro-application into a digital experience application. For example, a new micro-application may be inserted into a mock driver application to develop the new micro-application with context. Step 1204 may include performing a "build" command to compile code belonging to the micro-application. This may ensure that no errors exist between the new micro-application and the digital experience application. Step 1206 may include performing an "append" command to append the micro-application to the digital experience application.

Figure 13:
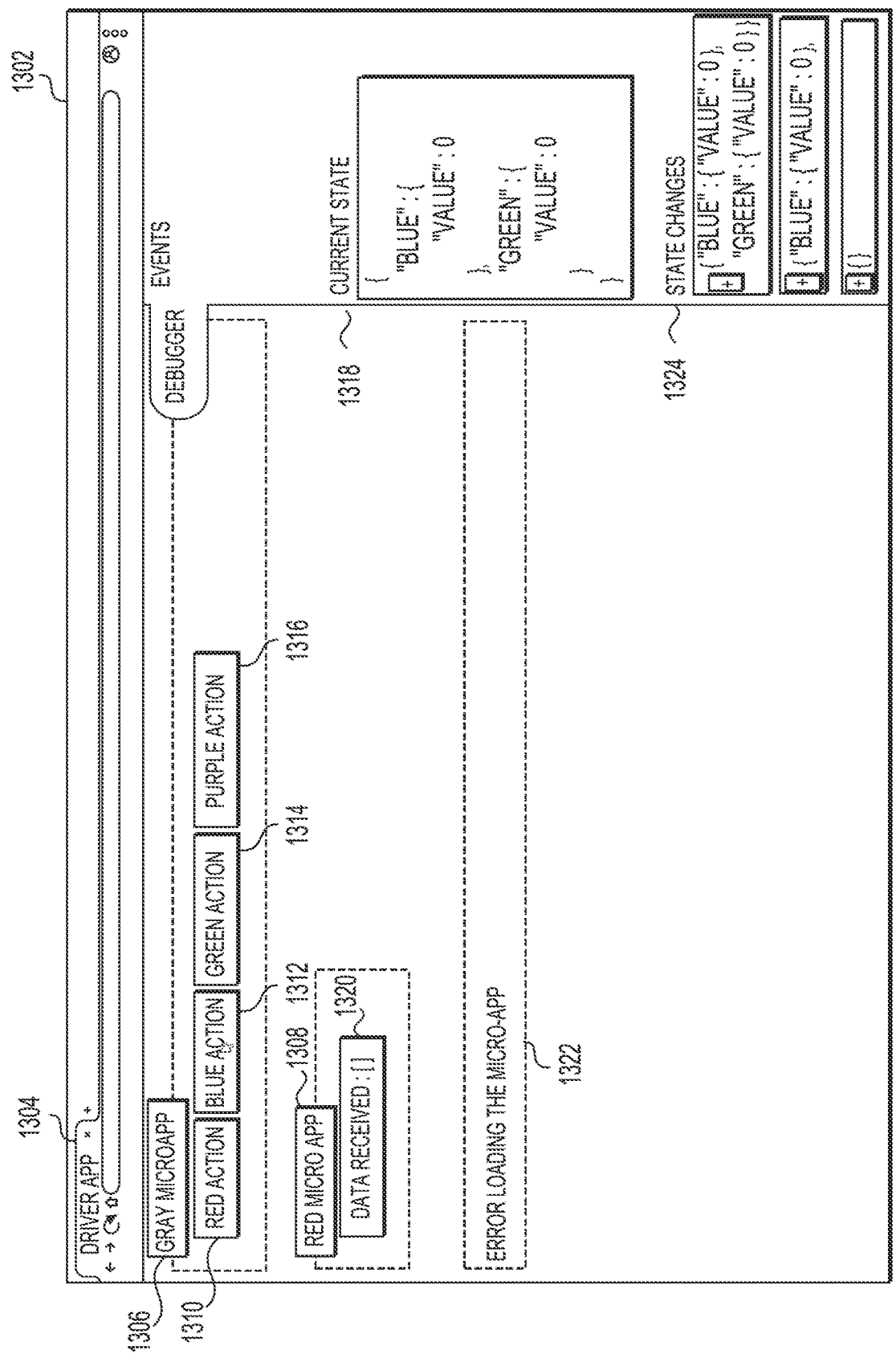
FIG. 13 is a schematic representation of an exemplary computer-implemented developer utility for developing digital experience applications according to embodiments of the present disclosure.

FIG. 13 is a schematic representation of an exemplary computer-implemented developer utility for developing digital experience applications, according to embodiments of the present disclosure. In one embodiment, the developer utility 1302 may comprise a series of functions to create, manage, and debug micro-applications, such as gray micro-application 1306 and red micro-application 1308. For example, a developer utility may comprise the commands and libraries mentioned above in connection with FIG. 10.

In another embodiment, the developer utility may comprise a user interface. The user interface may comprise one or more fields for displaying generated micro-applications. A generated micro-application, such as gray micro-application 1306, may be configured to display an action that may be configured to trigger an application event when a developer interacts with it, such as red action 1310, blue action 1312, green action 1314, and purple action 1316. A generated micro-application may be further configured to display data received as a result of an application event, such as such as red micro-application 1308 displaying data received 1320 as a result of red action 1310. The user interface may further comprise an error field 1322 that may be configured to display errors resulting from executing the application; an event field that may be configured to display previous application events; a current state field 1318 that may be configured to display current state information of the application; and an event changes field 1324 that may be configured to display changes in the state of the application. It is to be understood that the user interface may contain more or less fields than those indicated above.

In another embodiment, the developer utility may comprise one or more utilities integrated into the application development process. For example, as described above, micro-applications may be configured to contain a debug drawer to be able to capture and replay events as a part of the micro-application communication. Furthermore, the developer utility may comprise one or more of the following: automatic code formatting to format code into a uniform format for a more elegant and easy-to-read code; integrated linting techniques to automatically integrate standard rules and best practices for the programming language being used (e.g., TypeScript) and other programming information (e.g., stylesheets); pre-committing hooks to automatically integrate standard rules and best practices before a developer shares his or her code (e.g., by pushing the code to a Bitbucket or GitHub repository); test integration to automatically integrate testing units during the build process to ensure that the application functions properly after new code is added; a customizable build process to change the building process depending on the needs (e.g., development vs. production deployment); a micro-application project configured to able to have a separate folder for micro-application related components; and a root level component configured to be used as a mock driver-application container.

Figure 14:
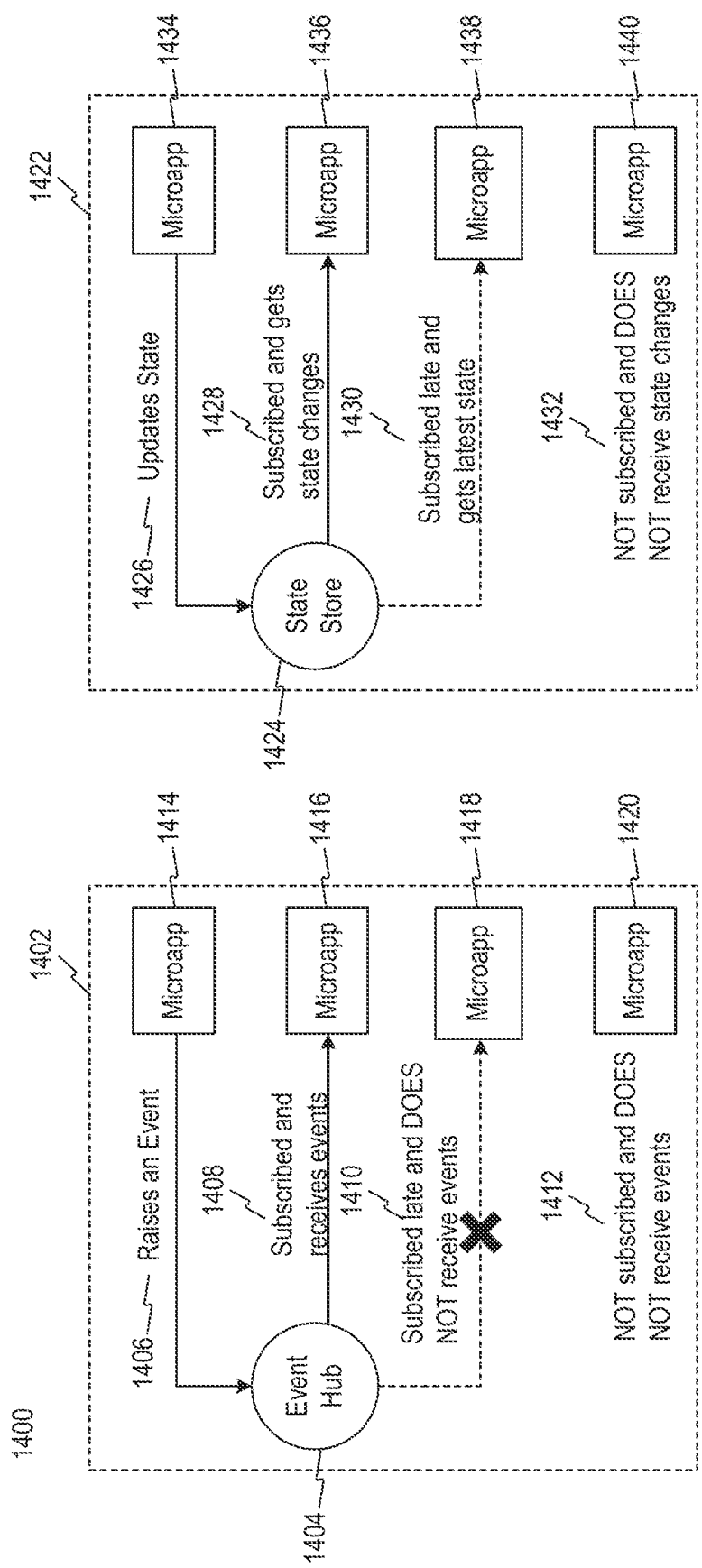
FIG. 14 is an exemplary developer utility according to embodiments of the present disclosure.

FIG. 14 is an exemplary developer utility, according to embodiments of the present disclosure. A developer utility, such as a debugger 1400, may be configured to display event information and state information being exchanged between micro-applications. This utility enables visualizing the interactions between states, events, and micro-applications and their components, allowing a developer to quickly validate micro-application functionality and behavior.

Debugger 1400 enables a developer to visualize an event hub 1404 within a driver application. In some embodiments, debugger 1400 enables the developer to review how event hub 1404 interacts with micro-applications 1414, 1416, 1418, and 1420. For example, debugger enables the developer to visualize the logical flow of steps. At 1406 micro-application 1414 raises an event belonging to a category. Event information relating to the event is sent to event hub 1404. At step 1408, a determination that micro-application 1416 is subscribed to receive events relating to the category (or alternatively relating to micro-application 1414) causes micro-application 1416 to receive the raised event. At step 1410, a determination that micro-application 1418 is subscribed to receive events relating to the category, but that the subscription occurred late, causes micro-application 1418 to not receive the raised event. At step 1412, a determination that micro-application 1420 is not subscribed to receive events belonging to the category causes micro-application 1420 to not receive the raised event.

Similarly, debugger 1400 enables a developer to visualize state store 1424 within a driver application. In some embodiments, debugger 1400 enables the developer to review how state store 1424 interacts with micro-applications 1434, 1436, 1438, and 1440. For example, debugger enables the developer to visualize the logical flow of steps. At 1426 micro-application 1434 detects an updated state belonging to a category. State change information is sent to state store 1424 for storage. At step 1428, a determination that micro-application 1436 is subscribed to receive state change information relating to the category (or alternatively relating to micro-application 1434) causes micro-application 1436 to receive the change information. At step 1430, a determination that micro-application 1438 is subscribed to receive state change information relating to the category, but that the subscription occurred late, causes micro-application 1438 to not receive the state change information. At step 1432, a determination that micro-application 1440 is not subscribed to receive events belonging to the category causes micro-application 1440 to not receive the state change information.

Figure 15:
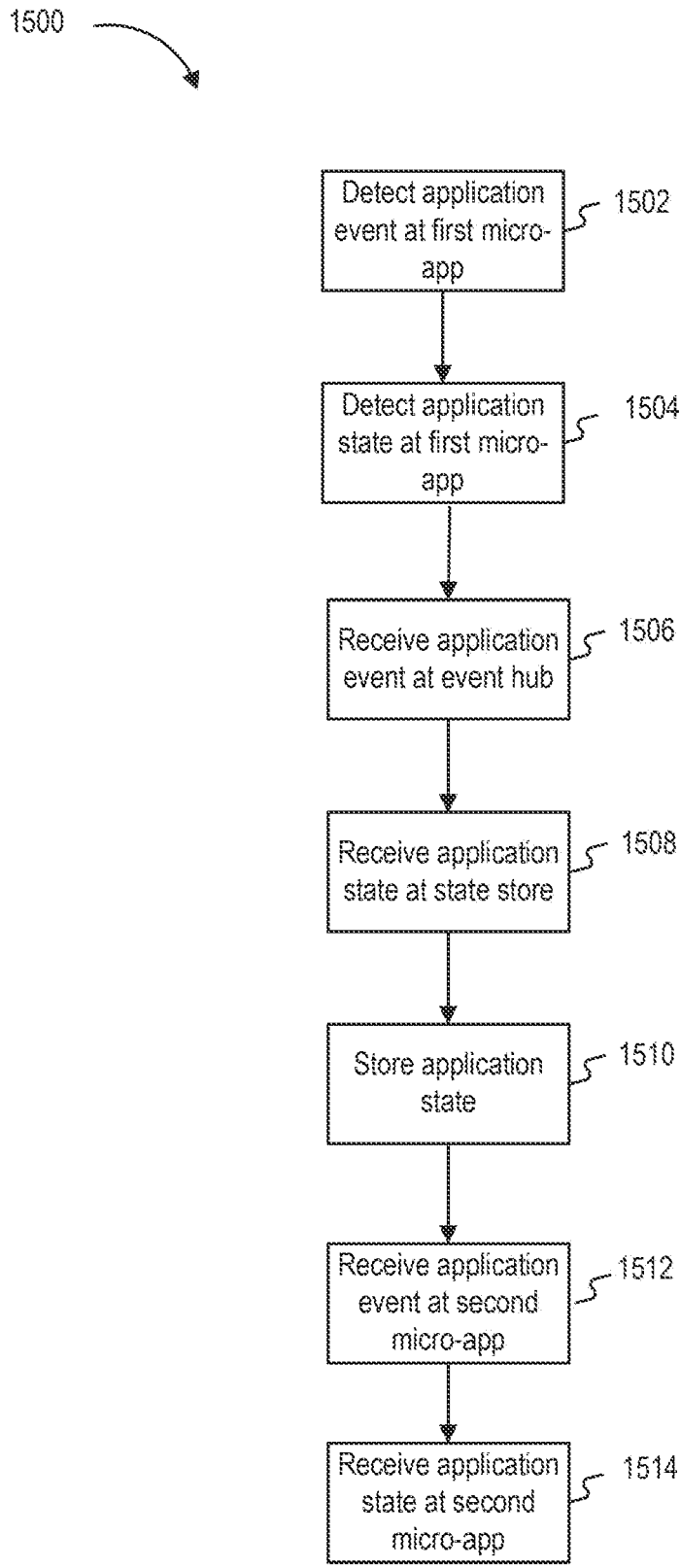
FIG. 15 is a flowchart of an exemplary computer-implemented method for providing a digital experience through an application in accordance with some embodiments.

FIG. 15 is a flowchart of an exemplary computer-implemented method 1500 for providing a digital experience through an application in accordance with some embodiments. Method 1500 may comprise step 1502 of detecting, at an event manager of a first micro-application, an application event belonging to a category. Method 1500 may comprise step 1504 of detecting, at a state manager of the first micro-application, an application state belonging to the category. Method 1500 may comprise step 1506 of receiving, at an event hub, the detected application event from the event manager of the first micro-application. Method 1500 may comprise step 1508 of receiving, at a state store, the detected application state from the state manager of the first micro-application. Method 1500 may comprise step 1510 of storing, at the state store, the detected application state. Method 1500 may comprise step 1512 of receiving, at an event manager of a second micro-application, the detected application event from the event hub. Method 1500 may comprise step 1514 of receiving, at a state manager of the second micro-application, the detected application state from the state store.

System for Processing Digital Experience Information

Figure 16:
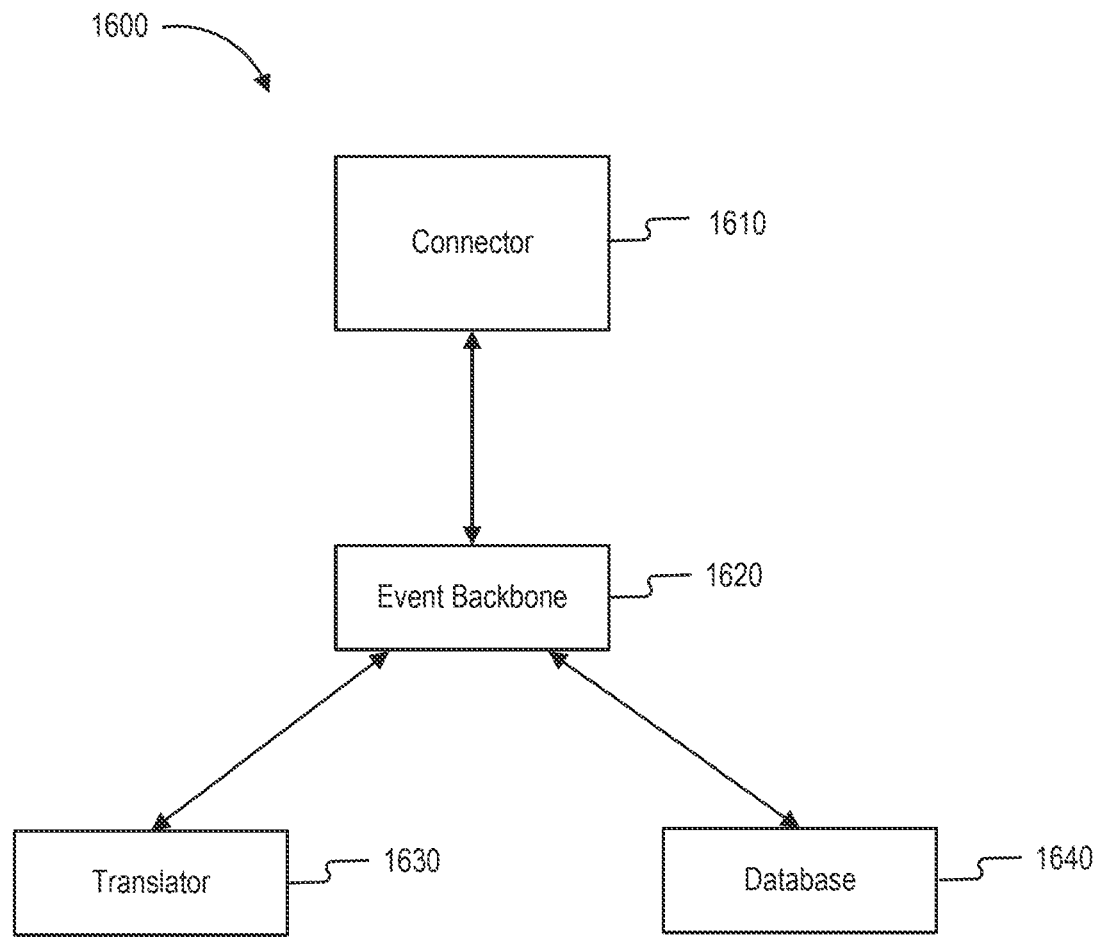
FIG. 16 is a schematic representation of an exemplary computer-implemented system for processing digital experience information in accordance with some embodiments.

FIG. 16 depicts an exemplary computer-implemented system 1600 for processing digital experience information, in accordance with some embodiments. System 1600 may comprise one or more connectors (e.g., connector 1610) that may be configured to send and receive information belonging to a category to and from one or more sources of information; one or more event backbones (e.g., event backbone 1620) that may be configured to route the received information using the category; one or more translators (e.g., translator 1630) that may be configured to transform received information into a common data model; and one or more databases (e.g., database 1640) for storing the received information. In some embodiments, system 1600 may comprise a streaming component (not shown) that may be configured to read information in system 1600 on an ad-hoc or real-time basis, and which may be configured to further process the information. In various embodiments, system 1600 may further comprise a dashboard (not shown) that may be configured to manage information in system 1600 (e.g., by interacting with backbone 1620 or database 1640).

Connector 1610 may be configured to send and receive information belonging to a category to and from one or more sources of information. In some embodiments, connector 1610 may comprise an interface. For example, connector 1610 may comprise an external application programming interface (API) that a digital application (e.g., a micro-application) may use to send and receive information to and from connector 1610. In various embodiments, connector 1610 may comprise an ingestion connector configured to send and receive information to and from one or more systems of record. For example, connector 1610 may comprise a message-oriented middleware component (e.g., MQ, or the like) and connecting logic created using a stream-processing software platform (e.g., ActiveMQ, RabbitMQ, Amazon Kinesis, Apache Spark, Akka, Apache Storm, Apache Flink, Redis, ZeroMQ, or the like). As an additional example, connector 1610 may further comprise logic configured to determine and track data that has changed (e.g., change data capture (CDC), or the like). As a further example, connector 1610 may comprise logic configured to receive information periodically. For example, connector 1610 may comprise a batch file processor.

Event backbone 1620 may be configured to route the received information using a category to which the information belongs. For example, event backbone 1620 may categorize received information into topics belonging to three general categories: ingestion topics for information in a schema other than the common data model, such as a schema belonging to the system of record (e.g., a table, file, or the like); common data model topics for information in a schema compliant with the common data model; and purpose-built topics for information in a schema that does not fit into the common data model due to gaps in the common data model (e.g., due to the information having data not recognized by the common data model). Event backbone 1620 may be further configured to route information based on the category. For example, event backbone 1620 may route information belonging to the ingestion topics to translator 1630 to be transformed into the common data model, and information belonging to the common data model topics or the purpose-built topics to database 1640 for storage. Event backbone 1620 may be further configured to send information to connector 1610. For example, event backbone 1620 may send information to connector 1610 on an ad-hoc basis, or as a result of an event. In some embodiments, event backbone 1620 may be configured to receive information that has been modified by an external application. For example, event backbone 1620 send information to a streaming component for further processing (e.g., based on user actions received through, for example, an application programming interface (API), or the like). The streaming component may then send the modified information to event backbone 1620.

Translator 1630 may be configured to transform received information into a common data model. In some embodiments, translator 1630 may be configured to transform all information belonging to a category. For example, translator 1630 may indicate to event backbone 1620 that it wishes to receive information belonging to the ingestion topic category, commonly referred to as "subscribing." In this manner, all information not complying with the common data scheme may be transformed without sharing it to other components of the system. Database 1640 may be configured to store the received information. For example, database 1640 may comprise one or more operation data stores (ODS) (e.g., NoSQL, RDBMS, or the like). It is to be understood that database 1640 may comprise one or more data stores, and may or may not be accessed remotely.

Figure 17:
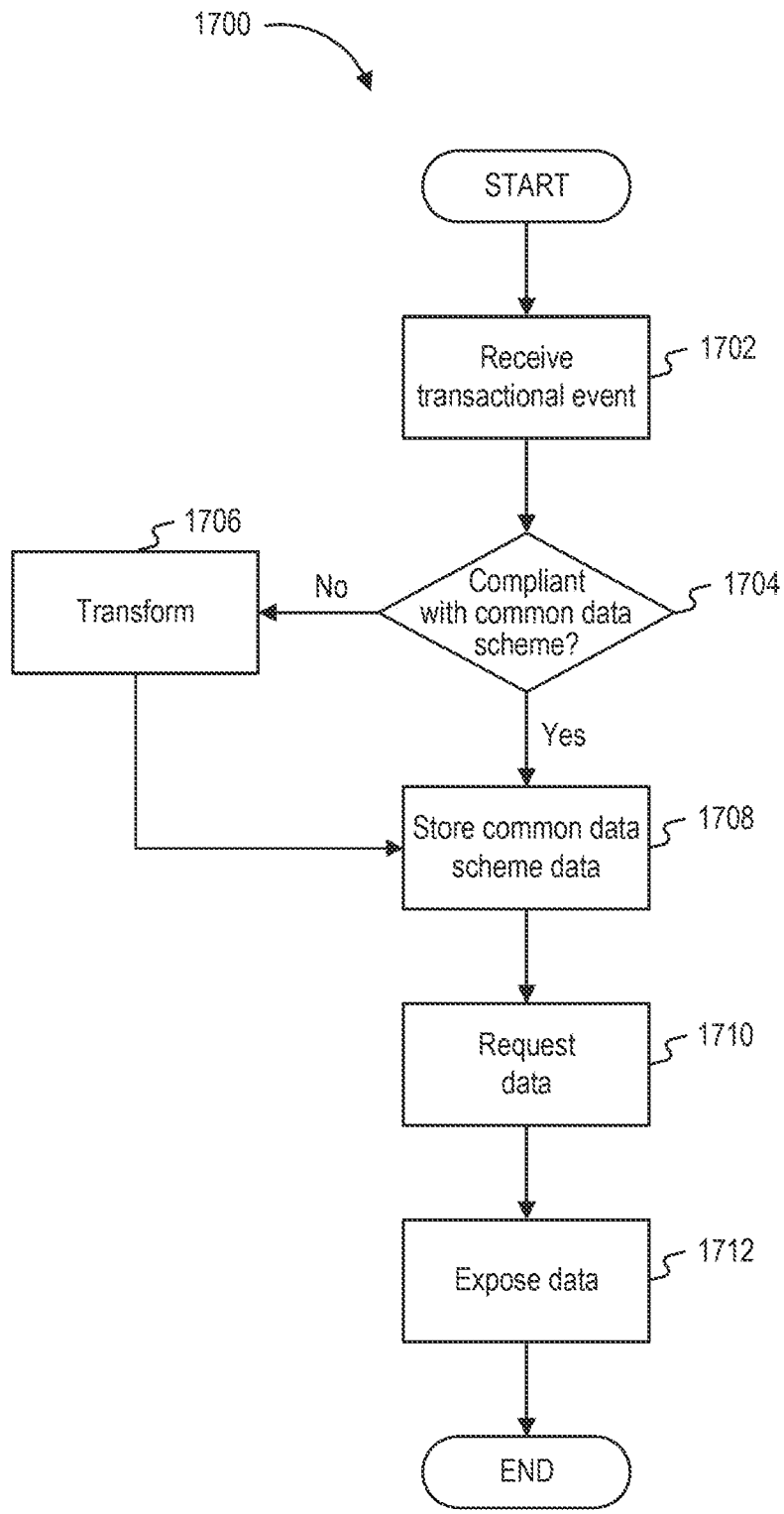
FIG. 17 is a flowchart of an exemplary computer-implemented method for processing digital experience information in accordance with some embodiments.

FIG. 17 depicts an exemplary computer-implemented method 1700 for processing digital experience information in accordance with some embodiments. The method 1700 may comprise the step 1702 of receiving a transactional event from a publisher. The transactional event may comprise transactional event data. The method may comprise the step 1704 of determining whether the transactional event data is compliant with a common data scheme. The method may comprise the step 1706 of transforming the transactional event data into common data scheme compliant data. The method may comprise the step 1708 of storing the common data scheme data in an event store. the method may comprise the step 1710 of receiving a request from the subscriber to expose the common data scheme compliant data. The request may allow the subscriber to query the common data scheme compliant data on an ad-hoc basis. The method may comprise the step 1712 of exposing the common data scheme compliant data to a subscriber in real-time.

System with a Passive Ingestion Connector

In some exemplary systems as disclosed herein, passive ingestion connectors can collect data in real-time and copy the data into an event backbone to make the data available for processing. The data may be available for processing, for example, by streaming applications with little to no changes on an existing system of record. A change data capture as part of the passive ingestion connector may be used for such a system. Additionally or alternatively, batch file ingestion may be used as part of a passive ingestion connector.

Figure 18:
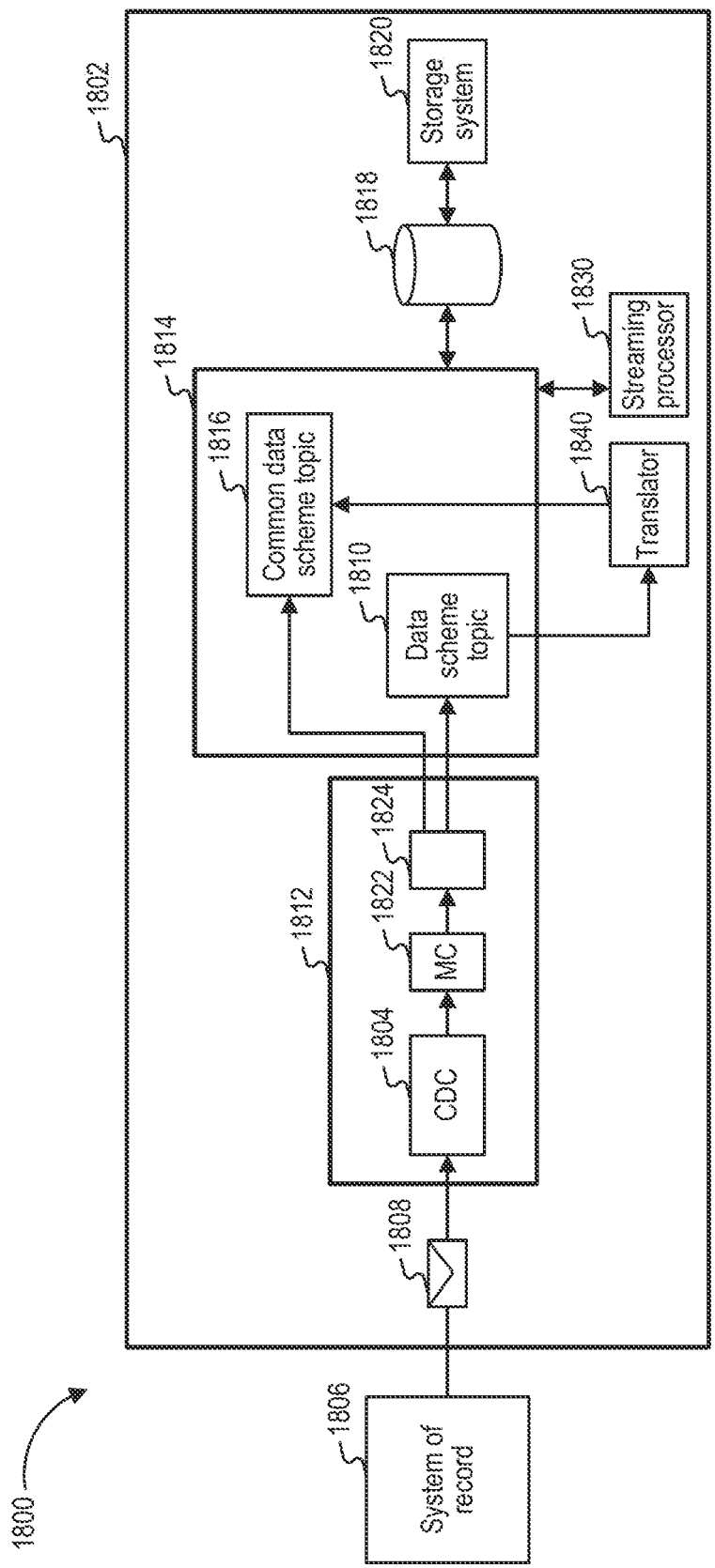
FIG. 18 is a schematic representation of another exemplary computer-implemented system for processing digital experience information using a passive ingestion connector, in accordance with some embodiments.

FIG. 18 depicts an exemplary computer-implemented system 1800 for processing digital experience information in accordance with some embodiments. The system 1800 may comprise a central data location 1802. The central data location 1802 may comprise an ingestion connector 1804. The ingestion connector 1804 may be configured to receive, from a system of record 1806, a transactional event 1808 comprising transactional event data. The ingestion connector 1804 may be configured to collect the transactional event data from the transactional event 1806. The ingestion connector 1804 may be configured to place the transactional event data onto a data scheme topic 1810. The ingestion connector 1804 may comprise a change data capture 1812 configured to determine and track data changes. The change data capture 1812 may aid in real-time collection of data by the ingestion connector 1804 by, for example, reducing the amount of data to be passed.

The central data location may include an event backbone 1814. The event backbone 1814 may be communicatively connected to the ingestion connector 1804. The event backbone may comprise a common data scheme topic 1816. The common data scheme topic 1816 may comprise one or a plurality of transactional events. The common data scheme topic 1816 may be formed from the data scheme topic 1810. The common data scheme topic 1816 may comprise transactional event data that the change data capture 1812 determined is changed.

The central data location 1802 may comprise an event store 1818 communicatively connected to the event backbone 1814. The event store 1818 may be configured to receive the common data scheme topic 1816 from the event backbone 1814. The event store 1818 may be configured to store the common data scheme topic 1816 in a storage system 1820. The central data location 1802 may comprise a streaming processor 1830 configured to stream the transactional event data to a subscriber.

The ingestion connector 1804 may further comprise a message-oriented middleware component 1822 communicatively connected to the change data capture 1812. The ingestion connector may further comprise a connecting logic 1824 communicatively connected to the change data capture 1812 and the middleware component 1822. The connecting logic 1824 may be configured to connect the ingestion connector 1804 to the event backbone 1814.

The system of record 1806 may be configured to be aware of the event backbone 1814, allowing the ingestion connector 1804 to receive the transactional event 1808 in real-time.

Figure 19:
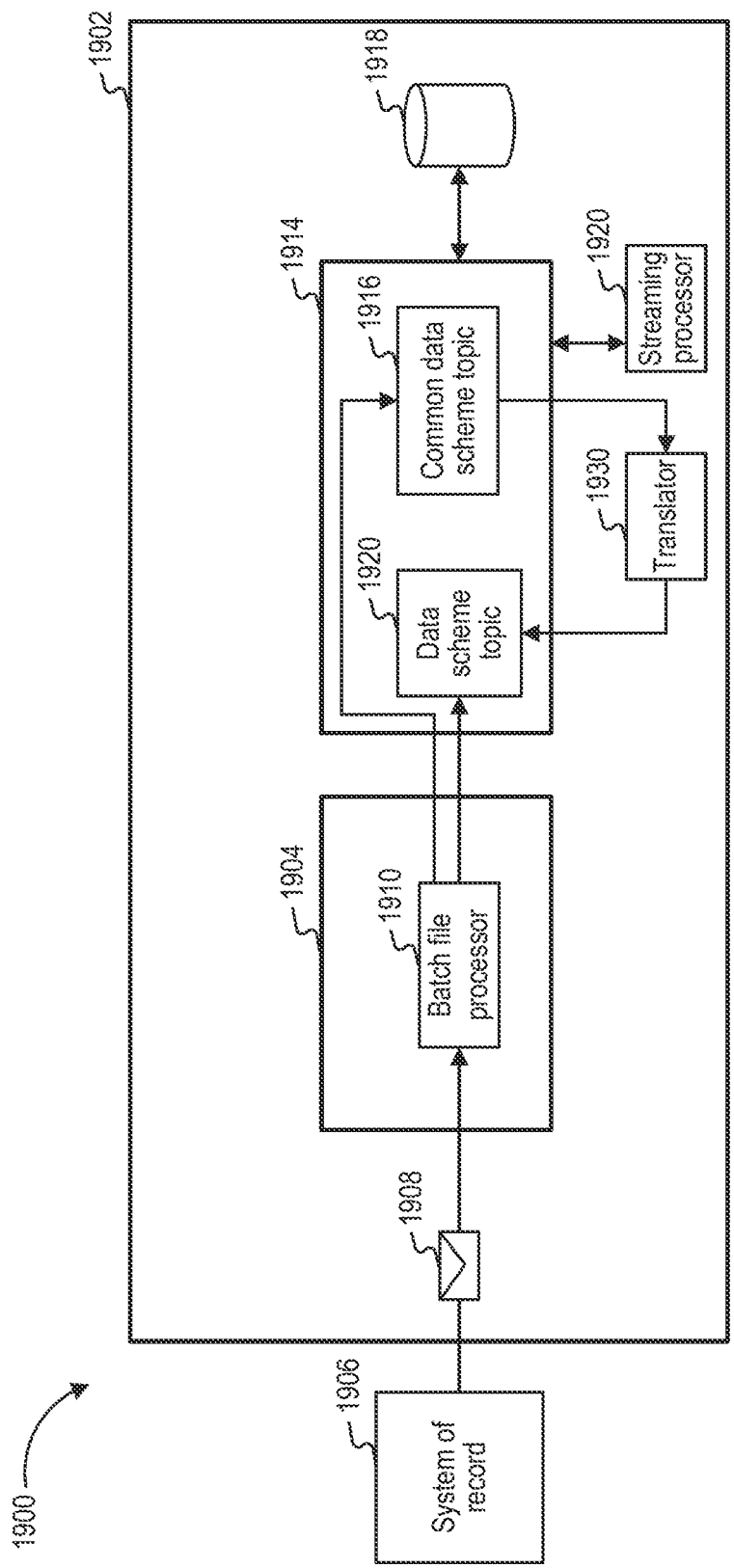
FIG. 19 is a schematic representation of another exemplary computer-implemented system for processing digital experience information using a passive ingestion connector, in accordance with some embodiments.

Batch file processor may also be used for passive ingestion. FIG. 19 depicts an exemplary computer-implemented system 1900 for processing digital experience information in accordance with some embodiments. The system 1900 may comprise a central data location 1902. The central data location 1902 may comprise an ingestion connector 1904. The ingestion connector 1904 may be configured to receive, from a system of record 1906, a batch file 1908.

The batch file 1908 may comprise transactional event data. The ingestion connector 1904 may comprise a batch file processor 1910. The batch file processor 1910 may be configured to place the transactional event data onto a data scheme topic 1912. The central data location 1902 may comprise an event backbone 1914. The event backbone 1914 may comprise a common data scheme topic 1916. The common data scheme topic 1916 may comprise one or a plurality of transactional events. The common data scheme topic 1916 may be formed from the data scheme topic 1912. The central data location 1902 may comprise an event store 1918 configured to store the common data scheme topic 1916. The central data location 1902 may comprise a streaming processor 1920 configured to stream, to a subscriber, a data scheme message. The system of record 1906 may be configured to be aware of the event backbone 1914, allowing the ingestion connector 1904 to receive the one or a plurality of transactional events in real-time.

System with an Active Ingestion Connector

Figure 20:
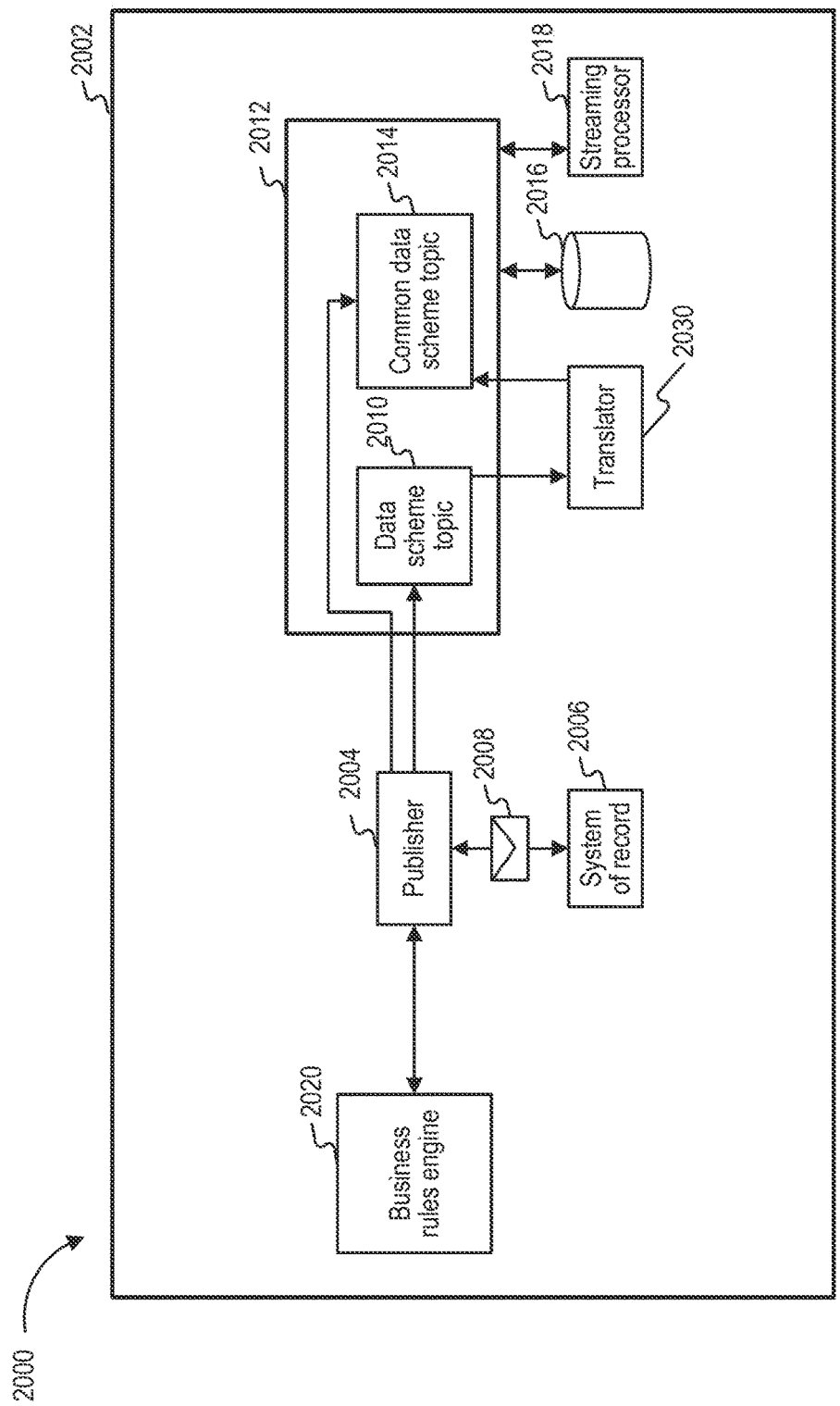
FIG. 20 is a schematic representation of another exemplary computer-implemented system for processing digital experience information using an active ingestion connector, in accordance with some embodiments.

In some exemplary systems as disclosed herein, active ingestion connectors can enable a system of record to send data in real-time to an event backbone. In some exemplary systems, active ingestion connectors may use publishers, such as APIs, to write directly to topics for active ingestion. FIG. 20 depicts an exemplary computer-implemented system 2000 for processing digital experience information in accordance with some embodiments. The system 2000 may comprise a central data location 2002. The central data location 2002 may comprise a publisher 2004 configured to publish, to a system of record 2006, a transactional event 2008 comprising transactional event data. The publisher 2004 may be configured to collect the transactional event data from the transactional event 2008. The publisher 2004 may be configured to place the transactional event data onto a data scheme topic 2010. The data scheme topic 2010 may comprise a data scheme message. The central data location 2002 may comprise an event backbone 2012. The event backbone 2012 may comprise a common data scheme topic 2014. The common data scheme topic 2014 may comprise one or a plurality of transactional events. The common data scheme topic 2014 may be formed from the data scheme message. The central data location 2002 may comprise an event store 2016 configured to store the common data scheme topic 2014. The central data location 2002 may comprise a streaming processor 2018 configured to stream, to a subscriber, the data scheme message.

The central data location 2002 may comprise a business rules engine 2020 configured to supply business rules to the publisher 2004. The publisher 2004 may be further configured to convert the transactional event data into a common data scheme using the business rules. The publisher 2004 may comprise a business rule. The publisher 2004 may be further configured to convert the transactional event data into a common data scheme using the business rule.

System with a Translator

Figure 21:
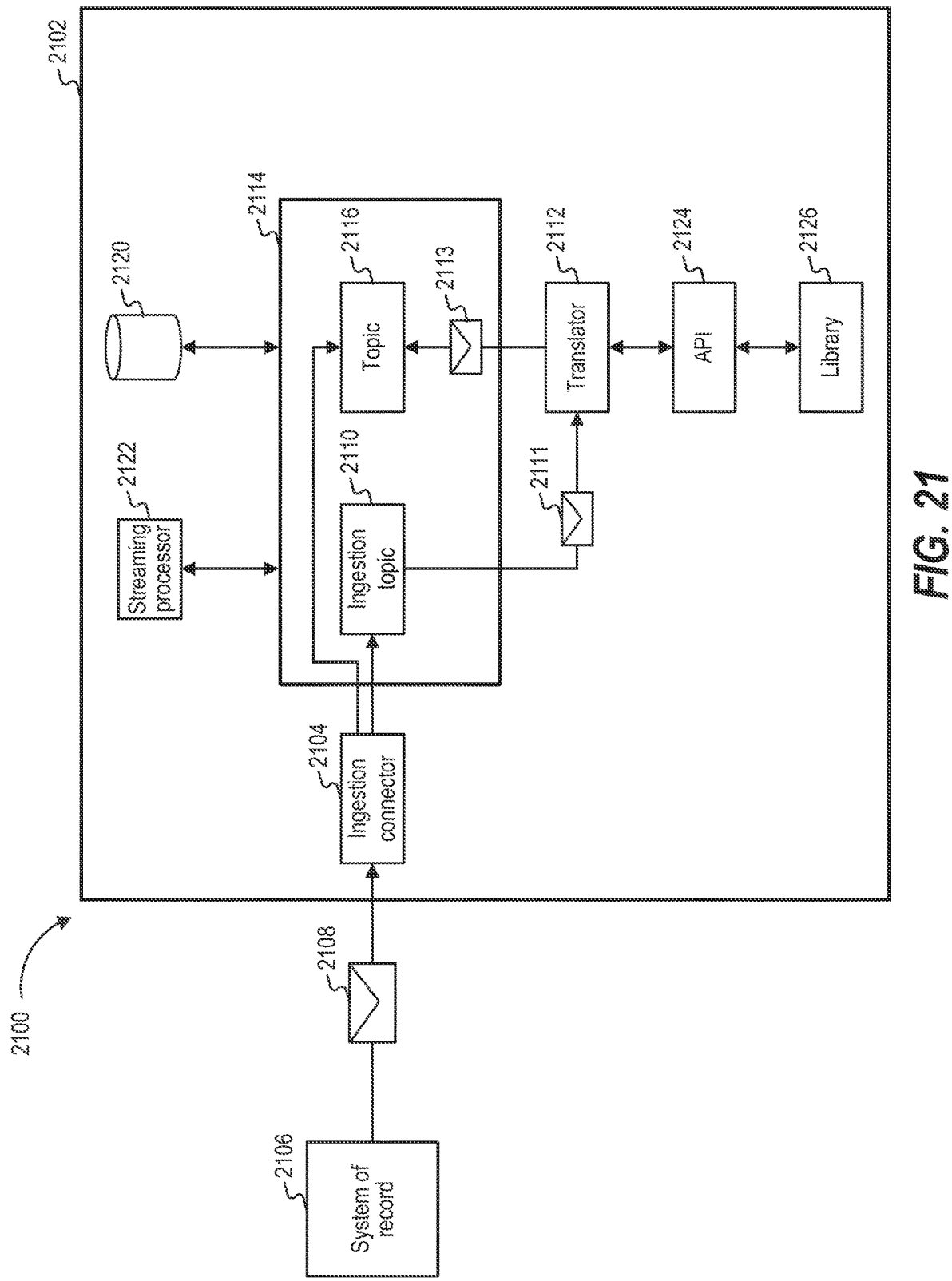
FIG. 21 is a schematic representation of another exemplary computer-implemented system for processing digital experience information using a translator, in accordance with some embodiments.

Some computer implemented systems disclosed herein include translators operable to transform ingestion topic messages into common data scheme messages. Additionally, some computer implemented systems disclosed herein allow ingestion topics to be enriched by an API. The translating and enriching functionality are one way some systems disclosed herein may create a book of reference in a common data scheme for numerous applications, such as micro-applications. FIG. 21 depicts an exemplary computer-implemented system 2100 for processing digital experience information in accordance with some embodiments. The system 2100 may comprise a central data location 2102. The central data location 2102 may comprise an ingestion connector 2104. The ingestion connector 2104 may be configured to receive in real-time, from a system of record 2106, a transactional event 2108 comprising transactional event data. The ingestion connector 2104 may be configured to collect the transactional event data from the transactional event 2108. The ingestion connector 2104 may be configured to place the transactional event data onto an ingestion topic 2110 in an ingestion topic message 2111. The central data location 2102 may comprise a translator 2112 configured to transform the ingestion topic message 2111 into a common data scheme message 2113. The central data location 2102 may comprise an event backbone 2114. The event backbone 2114 may comprise a topic 2116 comprising one or a plurality of transactional events. The topic 2116 may be formed from the common data scheme message 2113. The central data location 2102 may comprise an event store 2120 configured to store the topic 2116. The central data location 2102 may comprise a streaming processor 2122 configured to stream, to a subscriber, the common data scheme message 2113.

The translator 2112 may be configured to enrich the ingestion topic message 2111 with external data—that is data from sources other than directly from the ingestion connector 2104—by calling an API 2124. The external data may be BIAN compliant data. The external data may be geographic data. The external data may originate from applications, components of the central data location, or any other suitable origin. The API 2124 may be communicatively coupled to a library 2126. The library 2126 may supply data or executable operations for processing or producing data. The API 2124 may be configured to convert the common data scheme message 2113 into a BIAN compliant data scheme.

Accordingly, as shown in FIG. 21, the translator 2112 is operable to receive an ingestion topic message 2111 and translate the message 2111 into a common data scheme message 2113. The translator 2112 is also operable to use external data, such as the API 2124 to further process the data. Finally, the translator writes the common data scheme message 2113 to the topic 2116 in a common data scheme. The translator 2112, has thereby transformed the ingestion topic message 2111 into a common data scheme format. The underlying transactional event data contained within the ingestion topic message can now be stored via the event store 2120 or written to the streaming processor 2122. Now in the common data scheme format, the one or more transactional events are now easily accessible by other applications and by the user from the event store 2120 and the streaming processor 2122.

System with a Sink Connector

Figure 22:
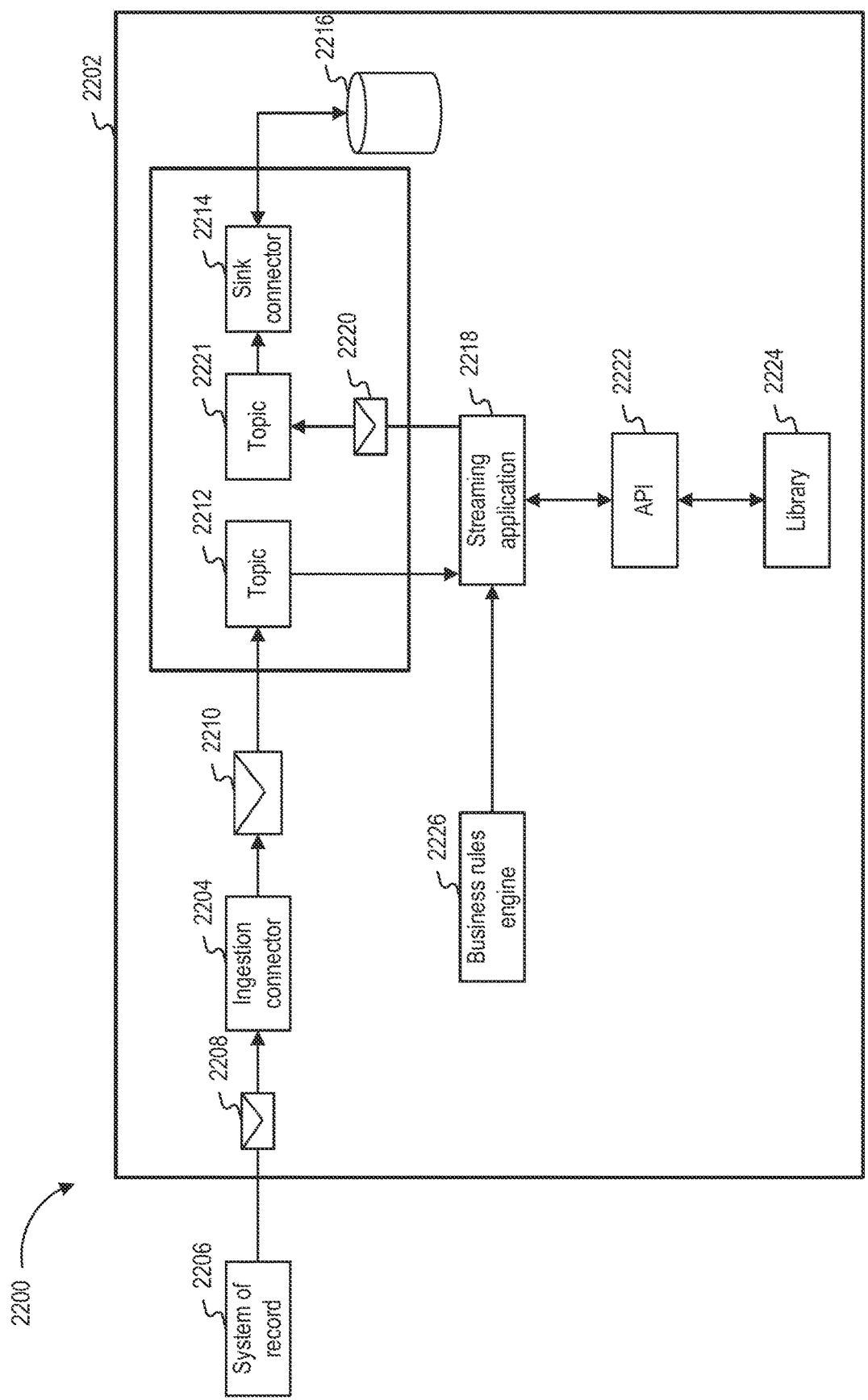
FIG. 22 is a schematic representation of another exemplary computer-implemented system for processing digital experience information using a sink connector, in accordance with some embodiments.

Some embodiments of the present disclosure may comprise a sink connector. The sink connector may write events into an event store such that the data can be queried. Therefore, a sink connector can allow a book of reference or central data location to access stored data such as historical data. FIG. 22 depicts an exemplary computer-implemented system 2200 for processing digital experience information in accordance with some embodiments. The system 2200 may comprise a central data location 2202. The central data location 2202 may comprise an ingestion connector 2204. The ingestion connector 2204 may be configured to receive in real-time, from a system of record 2206, a transactional event 2208 comprising transactional event data. The ingestion connector 2204 may be further configured to collect the transactional event data from the transactional event 2208. The ingestion connector 2204 may be further configured to place the transactional event data into a common data scheme message 2210. The ingestion connector 2204 may be further configured to place the common data scheme message 2210 containing the transactional event data onto a topic 2212. The topic 2212 may comprise one or a plurality of transactional events. The central data location 2202 may comprise a sink connector 2214 configured to transform the topic 2212 into a purpose-built topic. The sink connector 2214 may be configured to map, write, or send the transactional event data of the topic 2212 to an event store 2216 of the central data location 2202. The event store 2216 may be configured to store the topic 2212. The central data location 2202 may comprise a streaming processor 2218. The streaming processor 2218 may be configured to transform the common data scheme 2210 message into a query message 2220. The streaming processor 2218 may be configured to place the common data scheme message onto a topic 2221. The streaming processor 2218 may be configured to stream the query message 2220 to a subscriber.

The event store 2216 may be a JDBC (Java Database Connectivity) compliant data store. The sink connector 2214 may be a JDBC sink connector.

The streaming processor 2218 may be further configured to enrich the common data scheme message 2210 with external data by calling an API 2222. The external data may be BIAN compliant data. The external data may be geographic data. The API 2222 may be communicatively coupled to a library 2224. The API 2222 may be configured to convert the common data scheme message 2210 into a BIAN compliant data scheme.

The central data location 2202 may further comprise a business rules engine 2226. The business rules engine 2226 may be configured to supply business rules to the streaming processor 2218. The streaming processor 2218 may be configured to transform the common data scheme message 2210 into the query message 2220 using the business rules.

The streaming processor 2218 may further comprise a business rule. The streaming processor 2218 may be configured to transform the common data scheme message 2210 into the query message 2220 using the business rule.

System with a Streaming Application

Figure 23:
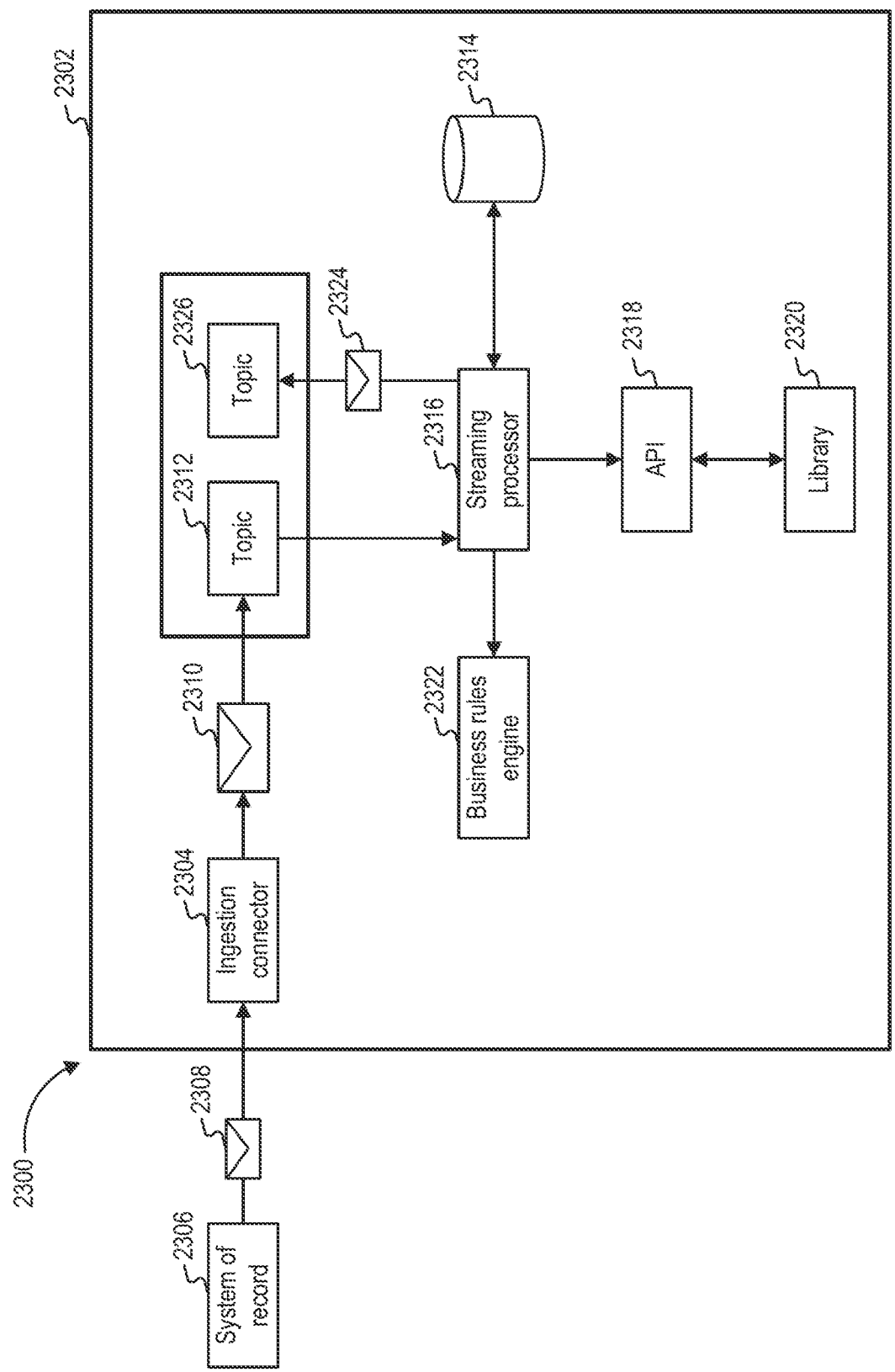
FIG. 23 is a schematic representation of another exemplary computer-implemented system for processing digital experience information using a streaming application, in accordance with some embodiments.

In some embodiments, a streaming application may allow a view of real-time event streams for data sets or changing data. A streaming application can read a current state from an event store and make calculations from a message, and then write a new state to the event store. FIG. 23 depicts an exemplary computer-implemented system 2300 for processing digital experience information in accordance with some embodiments. The system 2300 may comprise a central data location 2302. The central data location 2302 may comprise an ingestion connector 2304. The ingestion connector 2304 may be configured to receive in real-time, from a system of record 2306, a transactional event 2308 comprising transactional event data. The ingestion connector 2304 may be further configured to collect the transactional event data from the transactional event 2308. The ingestion connector 2304 may be configured to place the transactional event data into a common data scheme message 2310. The ingestion connector 2304 may be configured to place the common data scheme message 2310 containing the transactional event data onto a topic 2312. The topic 2312 may comprise one or a plurality of transactional events. The central data location 2302 may comprise an event store 2314 configured to store the topic 2312. The central data location 2302 may comprise a streaming processor 2316. The streaming processor 2316 may be configured to write the topic 2312 to the event store 2314. The streaming processor 2316 may be configured to read the topic 2312 from the event store 2314. The streaming processor 2316 may be configured to expose the topic 2312 to a subscriber 2318.

The streaming processor 2316 may comprise a cache 2317. The streaming processor 2316 may be configured to read the topic 2312 from the cache 2317.

The streaming processor 2316 may be further configured to enrich the common data scheme message 2310, with external data, by calling an API 2318. The API 2318 may be a subscriber to the streaming processor 2316. The external data may be BIAN compliant data. The external data may be geographic data. The API 2318 may be communicatively coupled to a library 2320. The API 2318 may be configured to convert the common data scheme message 2310 into a BIAN compliant data scheme. The central data location 2302 may further comprise a business rules engine 2322 configured to supply business rules to the streaming processor 2316. The streaming processor 2316 may be further configured to convert the common data scheme message 2310 from the topic 2312 into a query message 2324 using the business rules. The streaming processor 2316 may be configured to place the query message 2324 onto a topic 2326.

The streaming processor 2316 may comprise a business rule and may be further configured to convert the common data scheme message 2310 from the topic 2312 into the query message 2324 using the business rule. The streaming processor 2316 may be further configured to place the query message onto the topic 2312 or a topic 2326.

The streaming processor 2316 may be further configured to indicate a current state of the subscriber 2318. The current state may comprise a request state requesting the topic. The current state may comprise a receive state having received the topic.

System with an API Interface for Reading from an Event Store

Figure 24:
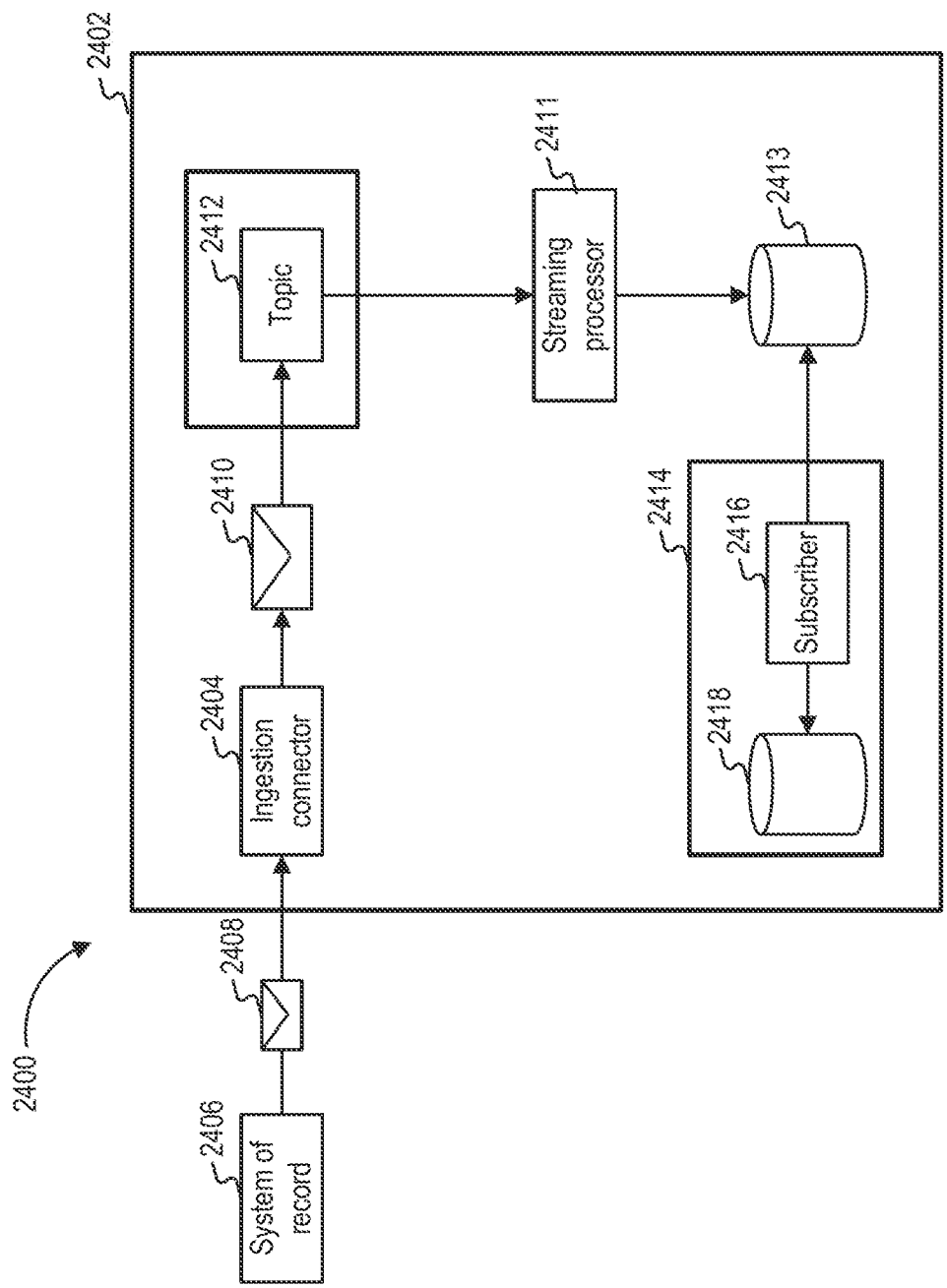
FIG. 24 is a schematic representation of another exemplary computer-implemented system for processing digital experience information using an API interface for reading from an event store, in accordance with some embodiments.

In some embodiments, one or more APIs may be used to read from a database of an event store. FIG. 24 depicts an exemplary computer-implemented system 2400 for processing digital experience information in accordance with some embodiments. The system 2400 may comprise a central data location 2402. The central data location 2402 may comprise an ingestion connector 2404. The ingestion connector 2404 may be configured to receive in real-time, from a system of record 2406, a transactional event 2408 comprising transactional event data. The ingestion connector 2404 may be configured to collect the transactional event data from the transactional event 2408. The ingestion connector 2404 may be configured to place the transactional event data, in a common data scheme message 2410, onto a topic 2412 comprising one or a plurality of transactional events. The central data location 2402 may comprise a streaming processor 2411 configured to write the topic 2412 to an event store 2413. The event store 2413 may be configured to store the topic 2412. The event store 2413 may be able to expose the topic 2412 to a subscriber 2416. The subscriber 2416 may be an API that is part of or all of an API interface 2414.

The event store 2413 may be configured to expose (i.e., enable access to) the topic 2412 using the API interface 2414. The API interface 2414 may be configured to use a MICRON framework. The event store 2413 may comprise an event store schema. The API interface 2414 may comprise an API schema. The event store schema may follow the API schema. The event store schema may be identical to the API schema.

The API interface 2414 may comprise a cache 2418. While the cache 2418 may be external, as shown in FIG. 24, the cache 2418 may alternatively be internal to the subscriber 2416.

System with an API Interface for Reading from an Event Backbone

Figure 25:
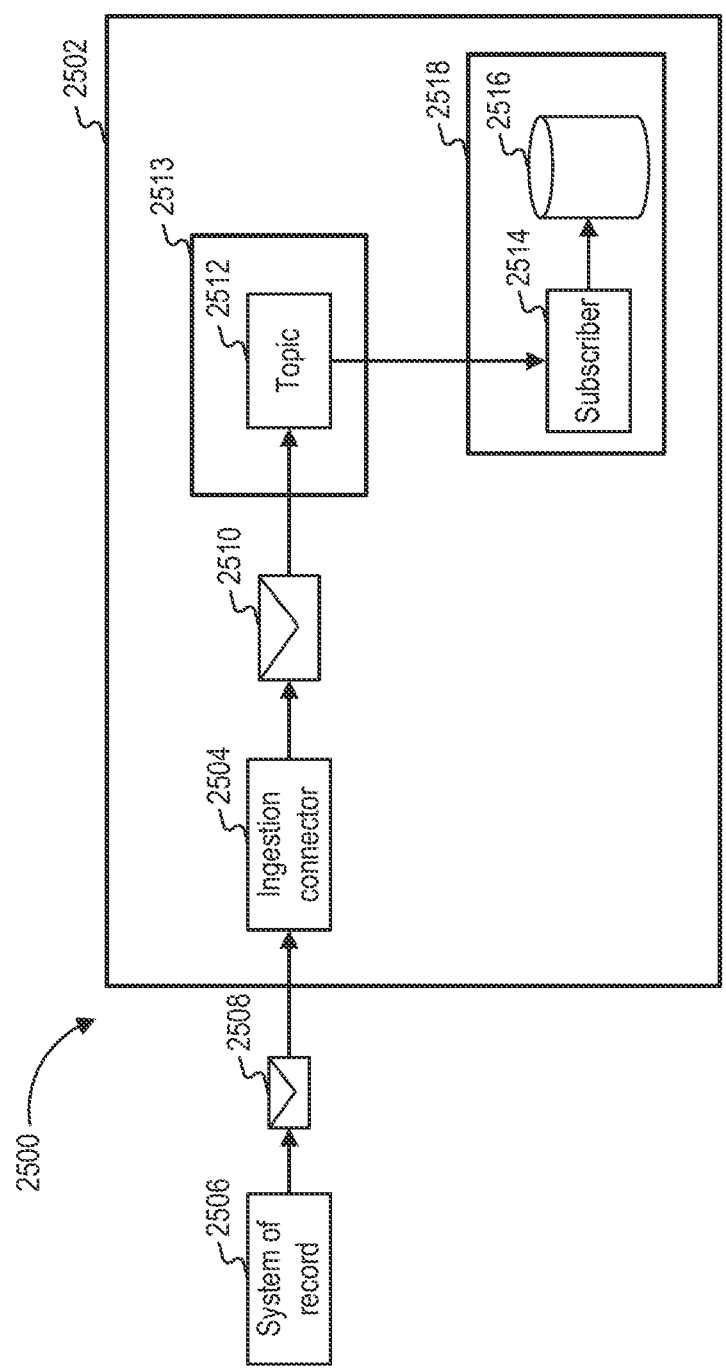
FIG. 25 is a schematic representation of another exemplary computer-implemented system for processing digital experience information using an API interface for reading from an event backbone, in accordance with some embodiments.

It may be beneficial to read directly from topics of an event backbone. Such an application may be useful, for example, when a topic contains a small set of objects, where a state table can be rebuilt by reprocessing all events. FIG. 25 depicts an exemplary computer-implemented system 2500 for processing digital experience information in accordance with some embodiments. The system 2500 may comprise a central data location 2502. The central data location 2502 may comprise an ingestion connector 2504. The ingestion connector 2504 may be configured to receive in real-time, from a system of record 2506, a transactional event 2508. The transactional event 2508 may comprise transactional event data. The ingestion connector 2504 may be configured to collect the transactional event data from the transactional event 2508. The ingestion connector 2504 may be configured to place the transactional event data, in a common data scheme message 2510, onto a topic 2512 of the event backbone 2513. The topic 2512 may comprise one or a plurality of transactional events. The topic 2512 may be configured to expose the common data scheme message 2510 to a subscriber 2514 (e.g., an API).

The topic 2512 may be configured to expose the common data scheme message 2510 using an API, wherein the subscriber 2514 is an API. The subscriber 2514 may comprise a cache 2516. While shown with a cache 2516 that is external to the subscriber 2514, the subscriber 2514 may have an internal cache. The subscriber 2514 may be part of an API interface 2518. The subscriber 2514 may be configured to read the topic 2512. The topic 2512 may be a Kafka topic.

System with a Schema Registry

Figure 26:
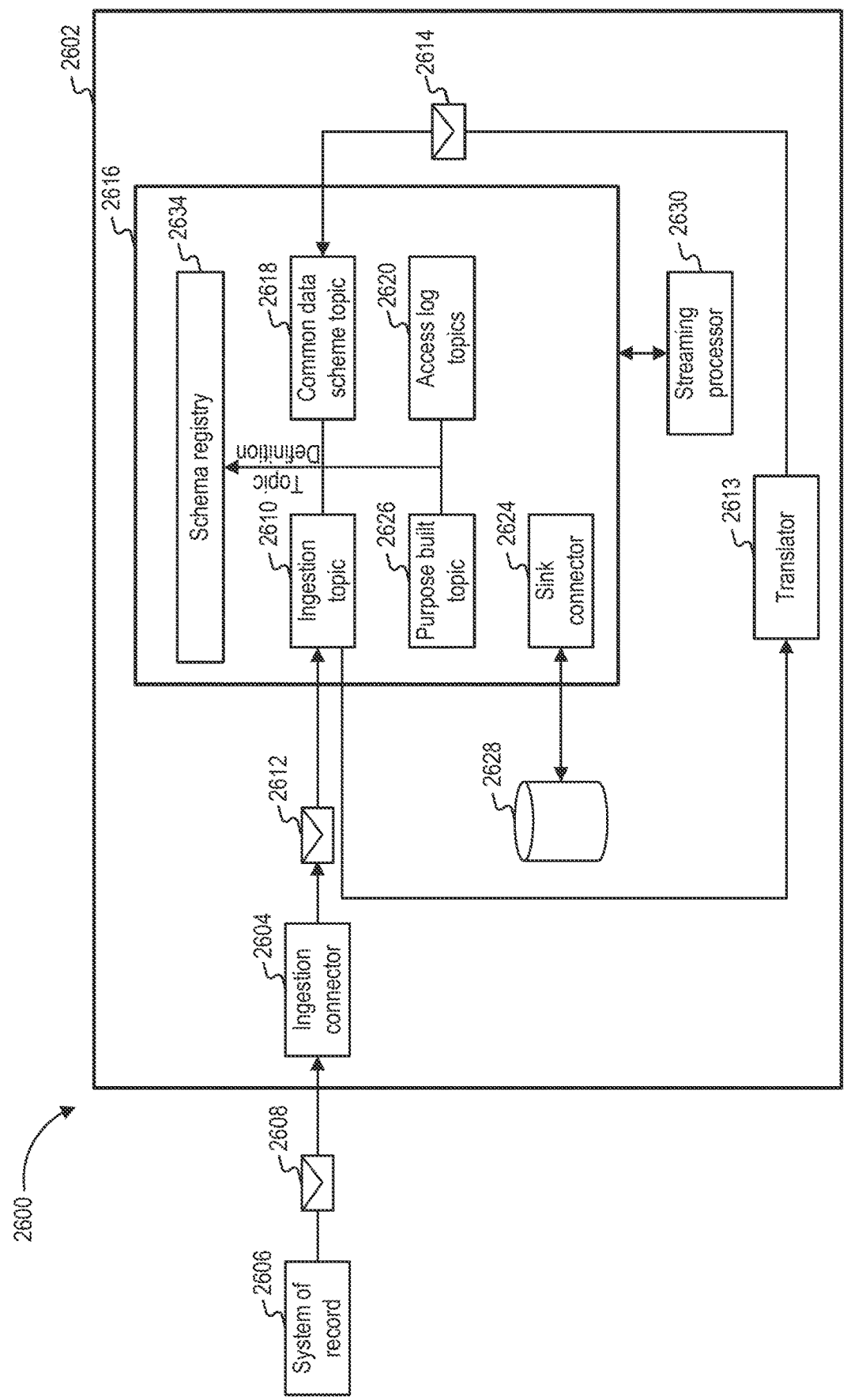
FIG. 26 is a schematic representation of another exemplary computer-implemented system for processing digital experience information using a schema registry, in accordance with some embodiments.

It may be beneficial to use a schema registry that defines topics. FIG. 26 depicts an exemplary computer-implemented system 2600 for processing digital experience information in accordance with some embodiments. The system 2600 may comprise a central data location 2602. The central data location 2602 may comprise an ingestion connector 2604. The ingestion connector 2604 may be configured to receive in real-time, from a system of record 2606, a transactional event 2608. The transactional event 2608 may comprise transactional event data. The ingestion connector 2604 may be further configured to collect the transactional event data from the transactional event 2608. The ingestion connector 2604 may be configured to place the transactional event data onto an ingestion topic 2610 in an ingestion topic message 2612. The central data location 2602 may comprise a translator 2613 configured to transform the ingestion topic message 2612 into a common data scheme message 2614. The central data location 2602 may comprise an event backbone 2616. The event backbone 2616 may comprise a common data scheme topic 2618. The common data scheme topic 2618 may comprise one or a plurality of transactional events. The common data scheme topic 2618 may be formed from the common data scheme message 2614. The event backbone 2616 may comprise an access logs topic 2620 communicatively coupled to a log management system 2622. The access logs topic 2620 may be configured to record access to the event backbone 2616. The access logs topic 2620 may report the access to the log management system 2622. The log management system 2622 may be configured to store log access information. The event backbone 2616 may comprise a sink connector 2624. The sink connector 2624 may be configured to write one or more of topics 2610, 2618, 2620, and a purpose-built topic 2626 to an event store 2628. The event store 2628 may be configured to store one or more of topics 2610, 2618, 2620, and 2626. The central data location 2602 may comprise a streaming processor 2630 configured to stream, to a subscriber 2632, the common data scheme message 2614.

The ingestion topic 2610 may comprise an ingestion topic schema defined using a schema registry 2634. The common data scheme topic 2614 may comprise a common data scheme topic schema defined using the schema registry 2634. The purpose-built topic 2626 may comprise a purpose-built topic schema defined using the schema registry. The access log topic 2620 may comprise an access log topic schema using the schema registry 2624. The schema registry 2634 may follow a serialization and deserialization standard. The serialization and deserialization standard may be Apache Avro.

The present disclosure has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware, but systems and methods consistent with the present disclosure can be implemented with hardware and software. In addition, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from consideration of the specification and practice of the embodiments disclosed herein. It is intended that the specification and examples be considered as example only, with a true scope and spirit of the disclosed embodiments being indicated by the following claims.

According to some embodiments, the operations, techniques, and/or components described herein can be implemented by a device or system, which can include one or more special-purpose computing devices. The special-purpose computing devices can be hard-wired to perform the operations, techniques, and/or components described herein, or can include digital electronic devices such as one or more application-specific integrated circuits (ASICs) or field programmable gate arrays (FPGAs) that are persistently programmed to perform the operations, techniques and/or components described herein, or can include one or more hardware processors programmed to perform such features of the present disclosure pursuant to program instructions in firmware, memory, other storage, or a combination. Such special-purpose computing devices can also combine custom hard-wired logic, ASICs, or FPGAs with custom programming to accomplish the technique and other features of the present disclosure. The special-purpose computing devices can be desktop computer systems, portable computer systems, handheld devices, networking devices, or any other device that can incorporate hard-wired and/or program logic to implement the techniques and other features of the present disclosure.

The one or more special-purpose computing devices can be generally controlled and coordinated by operating system software, such as IOS, Android, Blackberry, Chrome OS, Windows XP, Windows Vista, Windows 7, Windows 8, Windows Server, Windows CE, Unix, Linux, SunOS, Solaris, VxWorks, or other compatible operating systems. In other embodiments, the computing device can be controlled by a proprietary operating system. Operating systems can control and schedule computer processes for execution, perform memory management, provide file system, networking, I/O services, and provide a user interface functionality, such as a graphical user interface ("GUI"), among other things.

Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM. Accordingly, the disclosed embodiments are not limited to the above described examples, but instead are defined by the appended claims in light of their full scope of equivalents.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps.

It is intended, therefore, that the specification and examples be considered as example only, with a true scope and spirit being indicated by the following claims and their full scope of equivalents

What is claimed:

1. A system for collecting and distributing digital experience information, the system comprising:
    a database;
    at least one processor configured to execute stored instructions to provide:
        a first micro-application having a first micro-application event manager that detects an application event and a first micro-application state manager that detects an application state;
        a connector that receives first information corresponding to the detected application event and the detected application state, wherein the first information belongs to a category, is compliant in a first data scheme, and is stored in the database;
        an event backbone that:
            routes the first information received by the connector based on the category; and
            selects a second information from the database based on one or more criteria, wherein the selected second information is routed to a second micro-application by the connector;
        a third micro-application that sends third information to the connector,
            wherein the third information is compliant in a second data scheme,
            and wherein the first data scheme is different from the second data scheme; and
        a translator that transforms the first information and the third information into a common data scheme.

2. The system of claim 1, wherein the one or more criteria include a criterion based on the category.

3. The system of claim 1, wherein the first micro-application sends the first information to the event backbone and the database via a first set of application programming interfaces and the second micro-application receives the second information from the database via a second set of application programming interfaces.

4. The system of claim 3, wherein the first set of application programming interfaces scales differently from the second set of application programming interfaces.

5. The system of claim 3, wherein the first and second sets of application programming interfaces are built using a macron framework.

6. The system of claim 1, wherein the first micro-application further comprises an outer application programming interface.

7. The system of claim 6, wherein the outer application programming interface is built using the macron framework.

8. The system of claim 1, wherein the system comprises a system of record.

9. The system of claim 8, wherein the received first information is transmitted to the system of record before being stored in the database.

10. The system of claim 8, wherein the system comprises more than one system of record.

11. The system of claim 1, wherein the second micro-application receives the second information in real time.

12. The system of claim 1, wherein the database is a relational database management system (RDBMS) database.

13. The system of claim 1, wherein the database is a NoSQL database.

14. A computer-implemented method for collecting and distributing digital experience information, the method being performed by at least one processor and comprising:
    detecting an application event and an application state at a first micro-application, the first micro-application having a first micro-application event manager that detects an application event and a first micro-application state manager that detects an application state;
    receiving, at a connector, first information corresponding to the detected application event and the detected application state, wherein the first information belongs to a category, is compliant in a first data scheme, and is stored in a database;
    routing the first information received by the connector based on the category;
    selecting, at an event backbone, a second information from the database based on one or more criteria;
    routing the selected second information, via the connector, to a second micro-application; and
    sending third information to the connector via a third micro-application, wherein
        the third information is compliant in a second data scheme, and wherein
        the first data scheme is different from the second data scheme; and transforming the first information and the third information, via a translator, into a common data scheme.

15. The method of claim 14, wherein the one or more criteria include a criterion based on the category.

16. The method of claim 14, wherein the first micro-application sends the first information to the database via a first set of application programming interfaces and the second micro-application receives the second information from the database via a second set of application programming interfaces.

17. The method of claim 16, wherein the first set of application programming interfaces scales differently from the second set of application programming interfaces.

18. The method of claim 14, wherein the first micro-application further comprises an outer application programming interface.

19. The method of claim 14, wherein the database is a relational database management system (RDBMS) database.

20. The method of claim 19, wherein the database is a NoSQL database.

* * * * *